United States Patent
Sun et al.

(10) Patent No.: US 11,531,736 B1
(45) Date of Patent: Dec. 20, 2022

(54) USER AUTHENTICATION AS A SERVICE

(71) Applicant: Amazon Technologies, Inc., Seattle, WA (US)

(72) Inventors: Angela Sun, Seattle, WA (US); Vikram Kumar Gundeti, Bellevue, WA (US); Max David Klein, Seattle, WA (US); John Charles Howard, Redmond, WA (US)

(73) Assignee: Amazon Technologies, Inc., Seattle, WA (US)

(*) Notice: Subject to any disclaimer, the term of this patent is extended or adjusted under 35 U.S.C. 154(b) by 436 days.

(21) Appl. No.: 16/357,003

(22) Filed: Mar. 18, 2019

(51) Int. Cl.
| | |
|---|---|
| *H04L 29/06* | (2006.01) |
| *G06F 21/32* | (2013.01) |
| *G10L 17/22* | (2013.01) |
| *G06F 21/45* | (2013.01) |
| *G10L 17/00* | (2013.01) |

(52) U.S. Cl.
CPC .............. *G06F 21/32* (2013.01); *G06F 21/45* (2013.01); *G10L 17/00* (2013.01); *G10L 17/22* (2013.01)

(58) Field of Classification Search
CPC ......... G06F 21/32; G06F 21/45; G10L 17/00; G10L 17/22
See application file for complete search history.

(56) References Cited

U.S. PATENT DOCUMENTS

| | | | |
|---|---|---|---|
| 6,144,938 | A | 11/2000 | Surace et al. |
| 7,027,832 | B2 | 4/2006 | Gum |
| 7,502,738 | B2 | 3/2009 | Kennewick et al. |
| 8,902,045 | B1 | 12/2014 | Linn et al. |
| 9,426,139 | B1 | 8/2016 | McClintock et al. |
| 9,589,565 | B2 | 3/2017 | Boies et al. |
| 10,027,662 | B1 * | 7/2018 | Mutagi ................. G10L 15/22 |
| 2003/0097593 | A1 | 5/2003 | Sawa et al. |
| 2003/0167167 | A1 | 9/2003 | Gong |
| 2005/0091057 | A1 | 4/2005 | Phillips et al. |
| 2008/0101658 | A1 | 5/2008 | Ahern et al. |
| 2010/0115592 | A1 | 5/2010 | Belz et al. |

(Continued)

OTHER PUBLICATIONS

The Examiner's attention is hereby drawn to the specification and file history of co-pending U.S. Appl. No. 16/035,137, entitled "Dynamic User Authentication", filed Jul. 13, 2018, which may contain information relevant to the present application.

(Continued)

*Primary Examiner* — Brandon Hoffman
*Assistant Examiner* — William A Corum, Jr.
(74) *Attorney, Agent, or Firm* — Pierce Atwood LLP

(57) ABSTRACT

Systems, methods, and devices for adaptably authenticating a user are disclosed. A device captures a user input, and sends data corresponding thereto to a system. The system determines natural language understanding (NLU) results representing the user input. A user authentication component of the system receives the NLU results and determines a skill configured to perform an action responsive to the user input. The user authentication component adaptably performs user authentication based on a user authentication condition associated with the skill. If the user can be authenticated to the satisfaction of the condition, the NLU results data are sent to the skill, along with an indicator representing the user was authenticated by the system.

18 Claims, 15 Drawing Sheets

(56) References Cited

U.S. PATENT DOCUMENTS

| | | |
|---|---|---|
| 2012/0245941 A1 | 9/2012 | Cheyer |
| 2013/0198081 A1 | 8/2013 | Royyuru et al. |
| 2013/0232542 A1 | 9/2013 | Cheng et al. |
| 2013/0263224 A1 | 10/2013 | Peters et al. |
| 2014/0189779 A1 | 7/2014 | Baghdasaryan et al. |
| 2015/0035643 A1 | 2/2015 | Kursun |
| 2015/0089668 A1 | 3/2015 | Baldwin et al. |
| 2015/0242601 A1 | 8/2015 | Griffiths et al. |
| 2015/0242605 A1 | 8/2015 | Du et al. |
| 2015/0279357 A1 | 10/2015 | Paxinos et al. |
| 2016/0087952 A1 | 3/2016 | Tartz et al. |
| 2016/0087957 A1 | 3/2016 | Shah et al. |
| 2016/0093285 A1 | 3/2016 | Christian et al. |
| 2016/0196556 A1 | 7/2016 | Tamboly et al. |
| 2016/0359827 A1 | 12/2016 | Krishnaiah |
| 2017/0236509 A1 | 8/2017 | Pulz et al. |
| 2018/0122361 A1 | 5/2018 | Silveira Ocampo |
| 2019/0251975 A1* | 8/2019 | Choi ................. G06F 21/32 |
| 2020/0045041 A1* | 2/2020 | Heidari ............. H04L 63/0861 |
| 2020/0342881 A1* | 10/2020 | Casado ............... G10L 17/22 |
| 2021/0021999 A1* | 1/2021 | Ramic ............... H04L 63/0861 |

OTHER PUBLICATIONS

The Examiner's attention is hereby drawn to the specification and file history of co-pending U.S. Appl. No. 15/611,288, entitled "Configurable Output Data Formats", filed Jun. 1, 2017, which may contain information relevant to the present application.

* cited by examiner

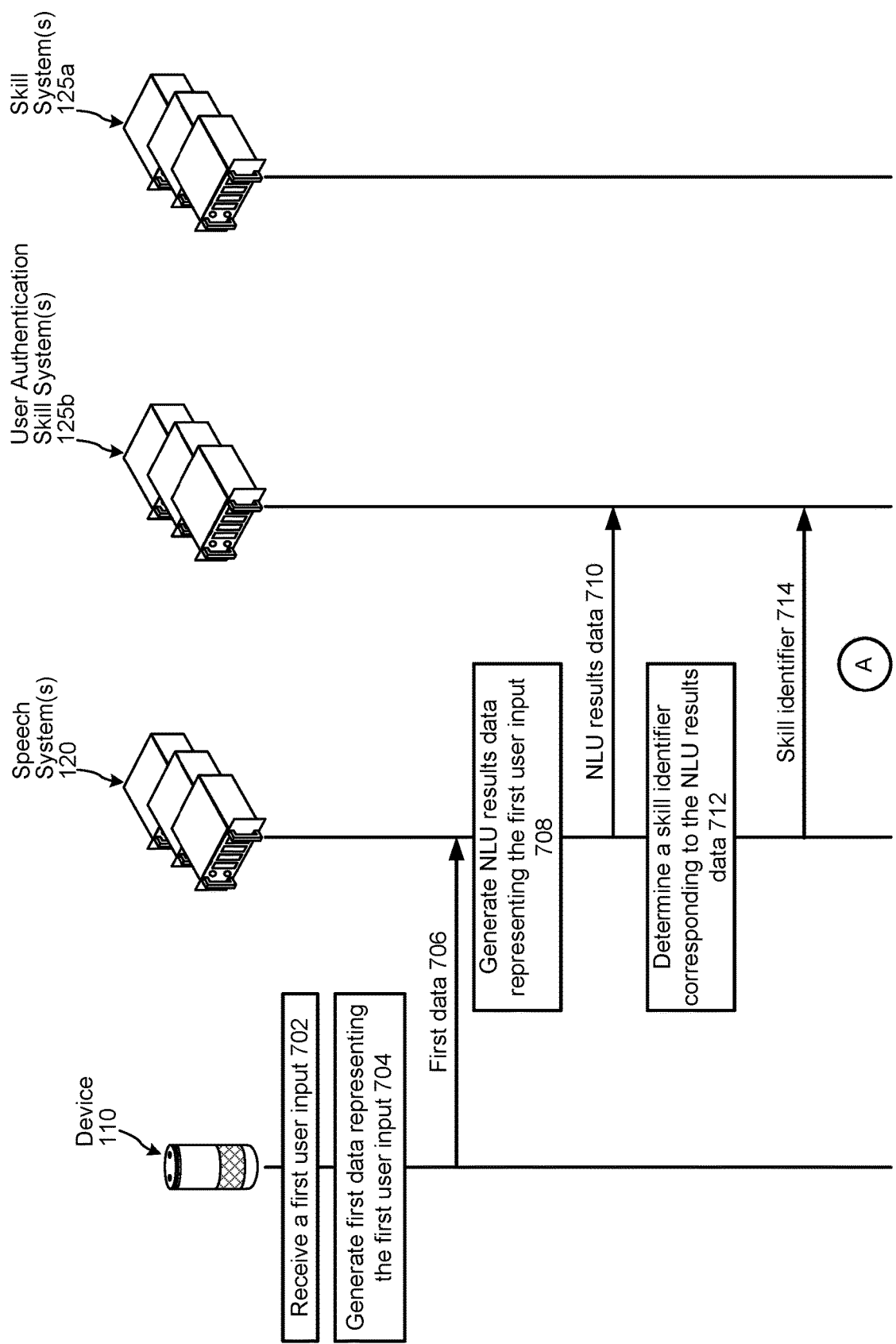

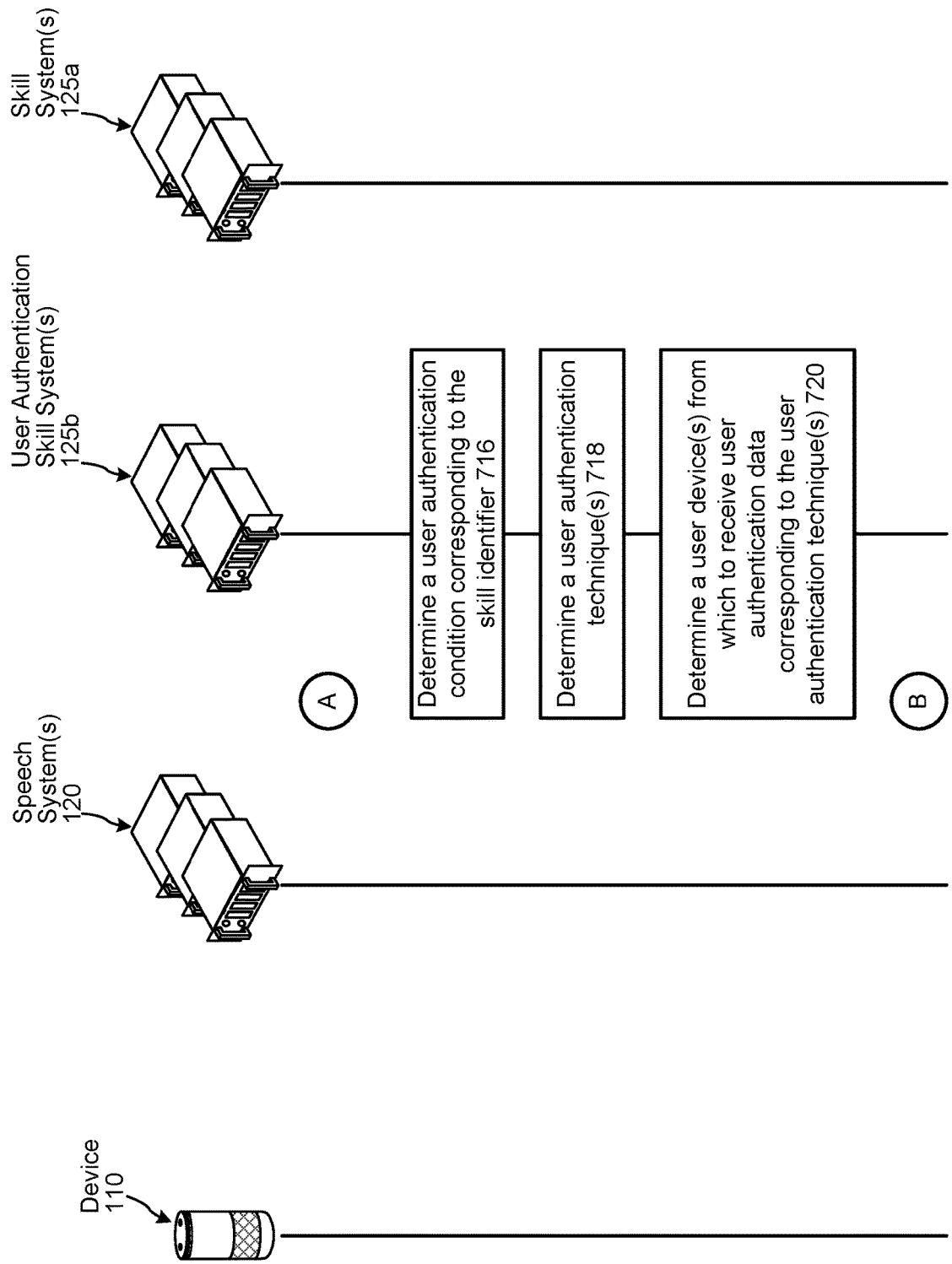

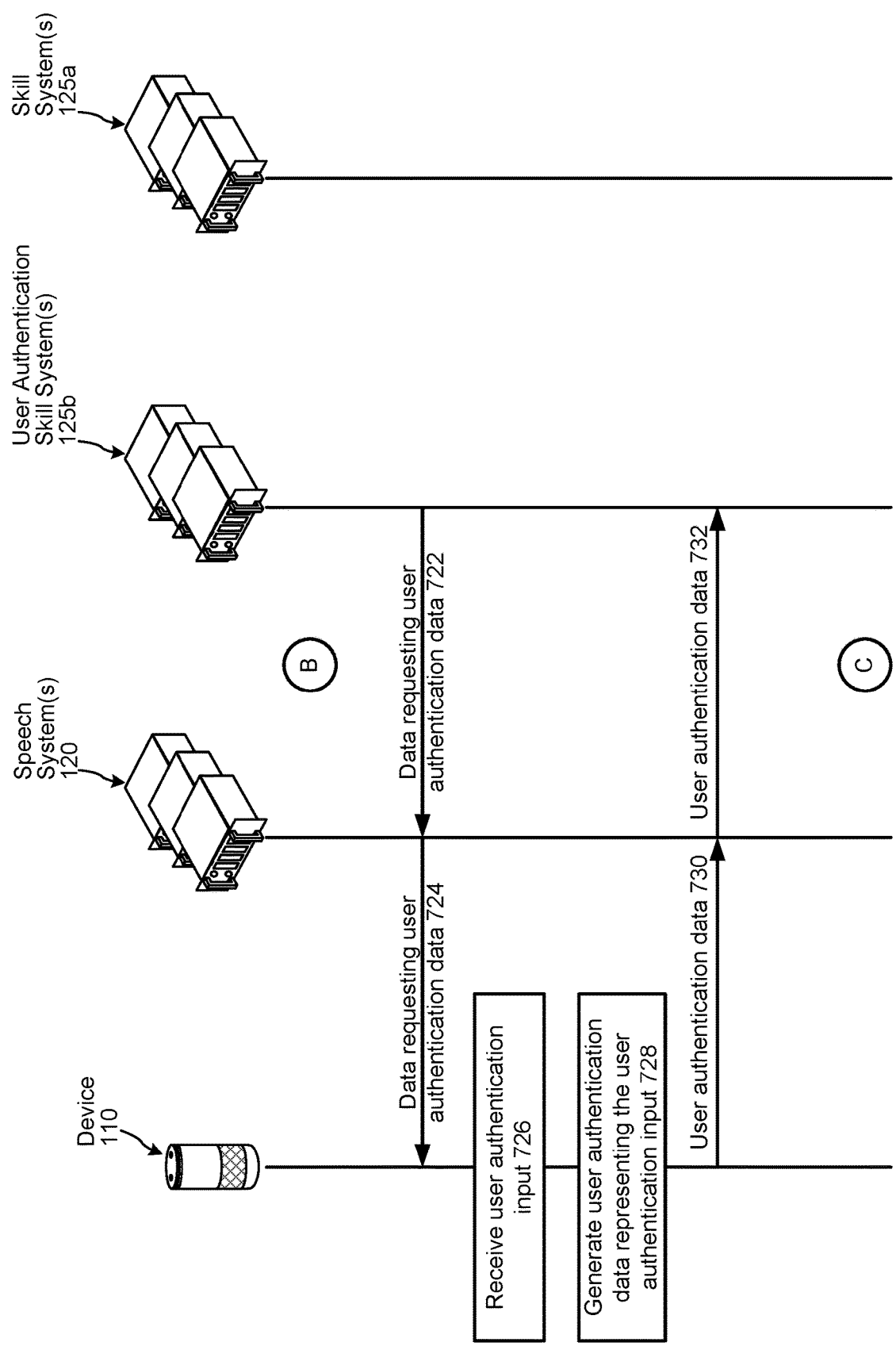

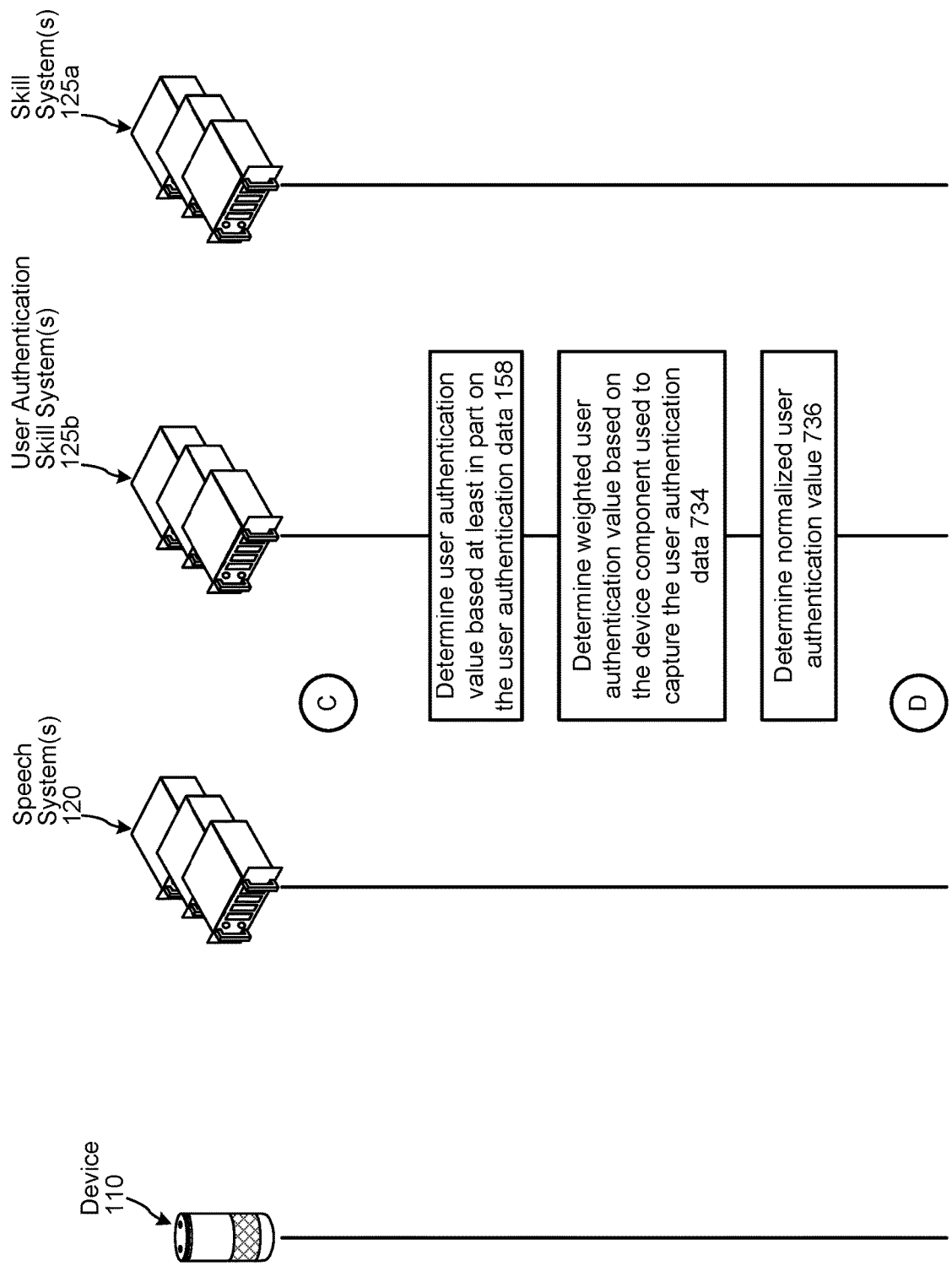

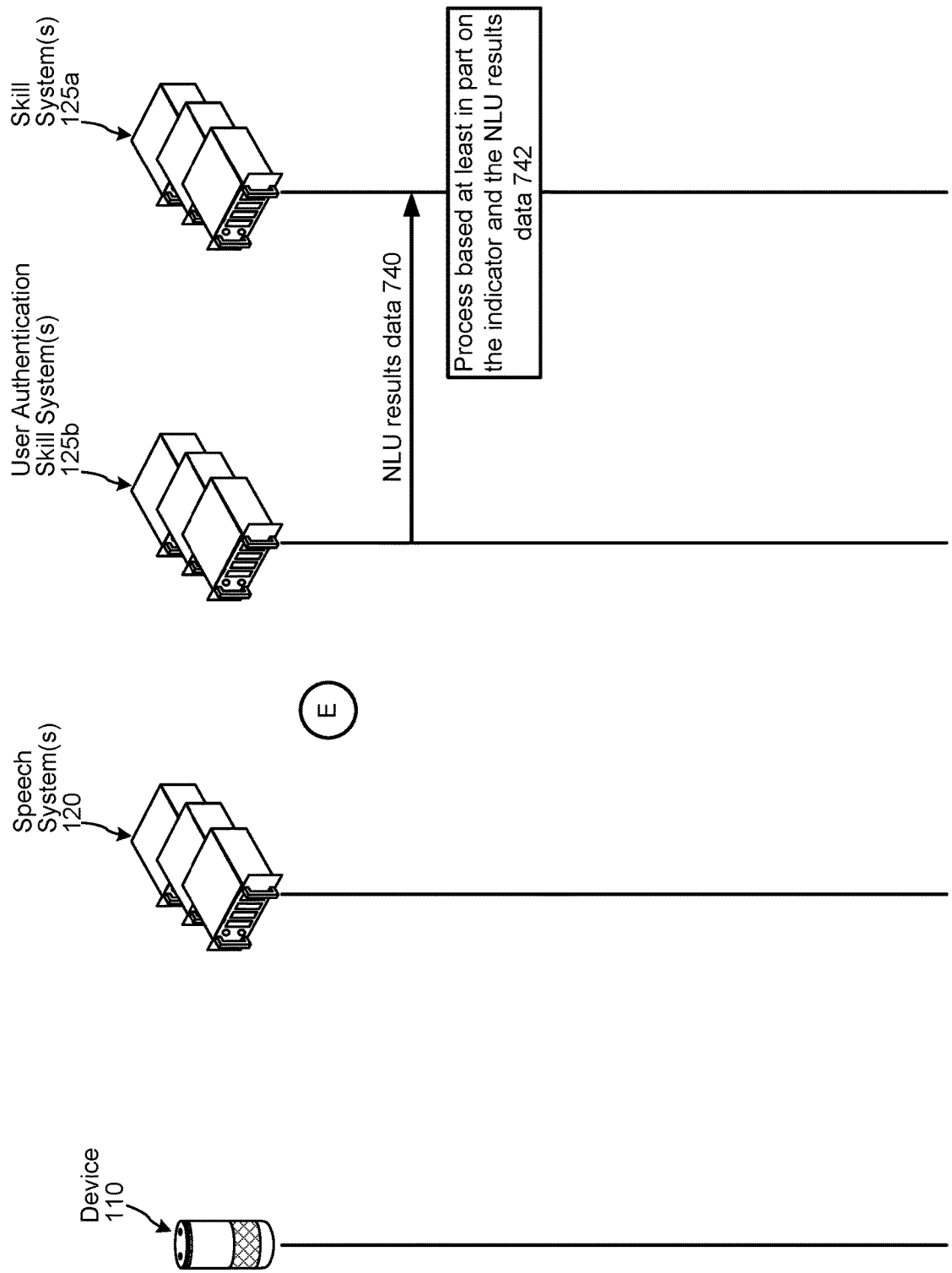

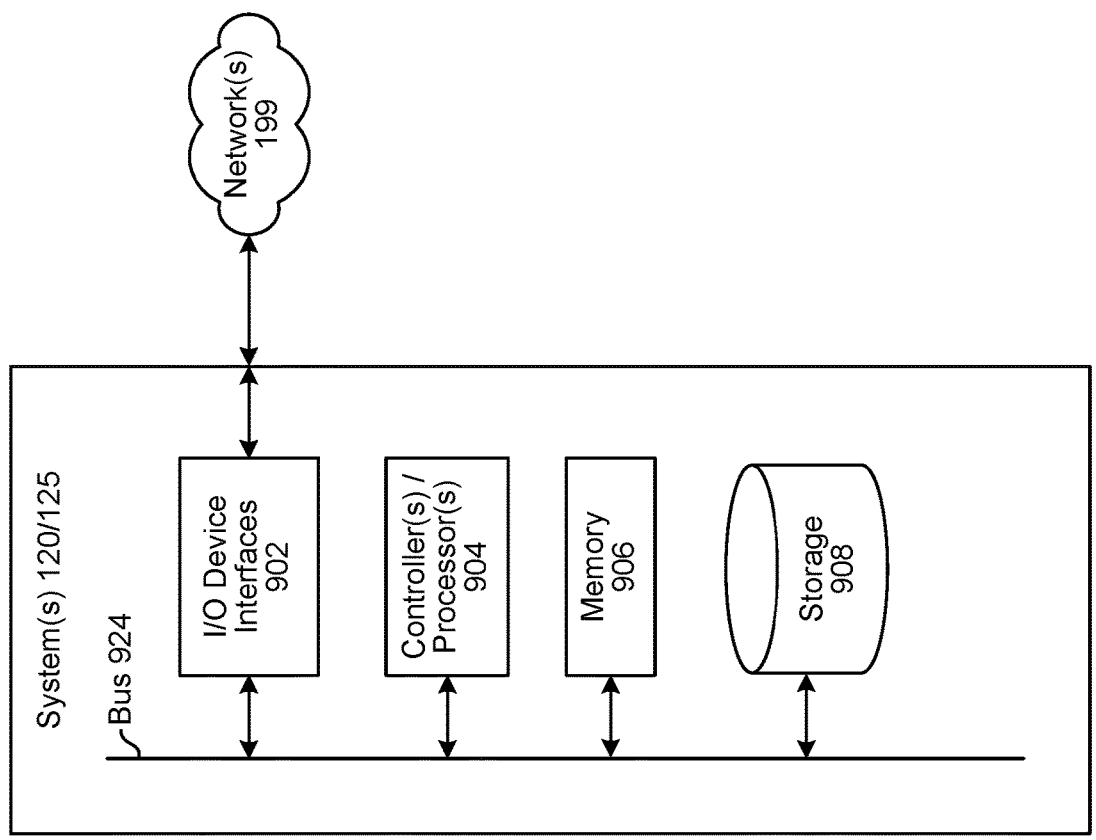

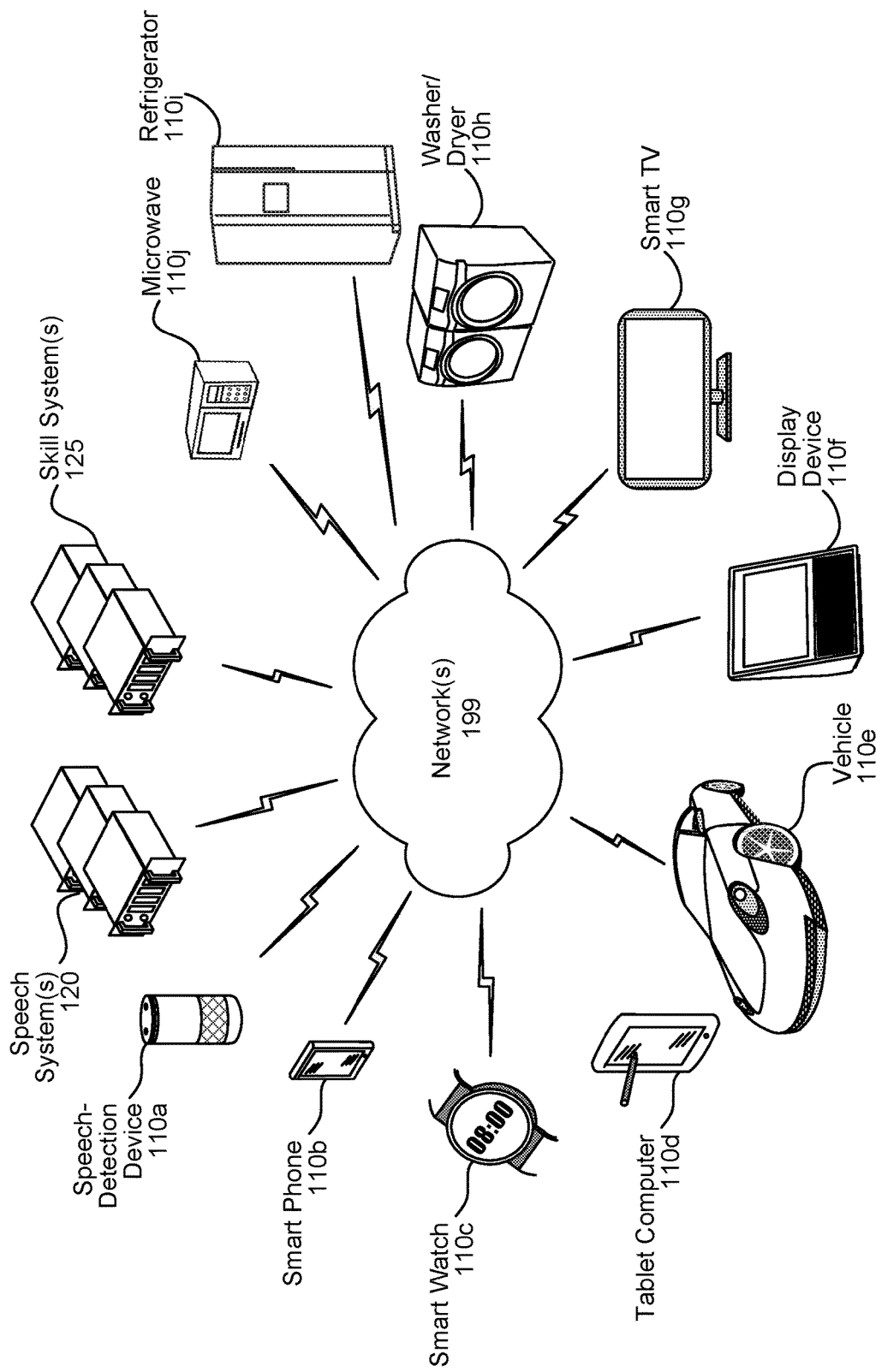

USER AUTHENTICATION AS A SERVICE

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 7A through 7F are a signal flow diagram illustrating adaptable user authentication, in accordance with embodiments of the present disclosure.

FIG. 9 is a block diagram conceptually illustrating example components of a system, in accordance with embodiments of the present disclosure.

FIG. 10 illustrates an example of a computer network for use with the overall system, in accordance with embodiments of the present disclosure.

DETAILED DESCRIPTION

Figure 1:
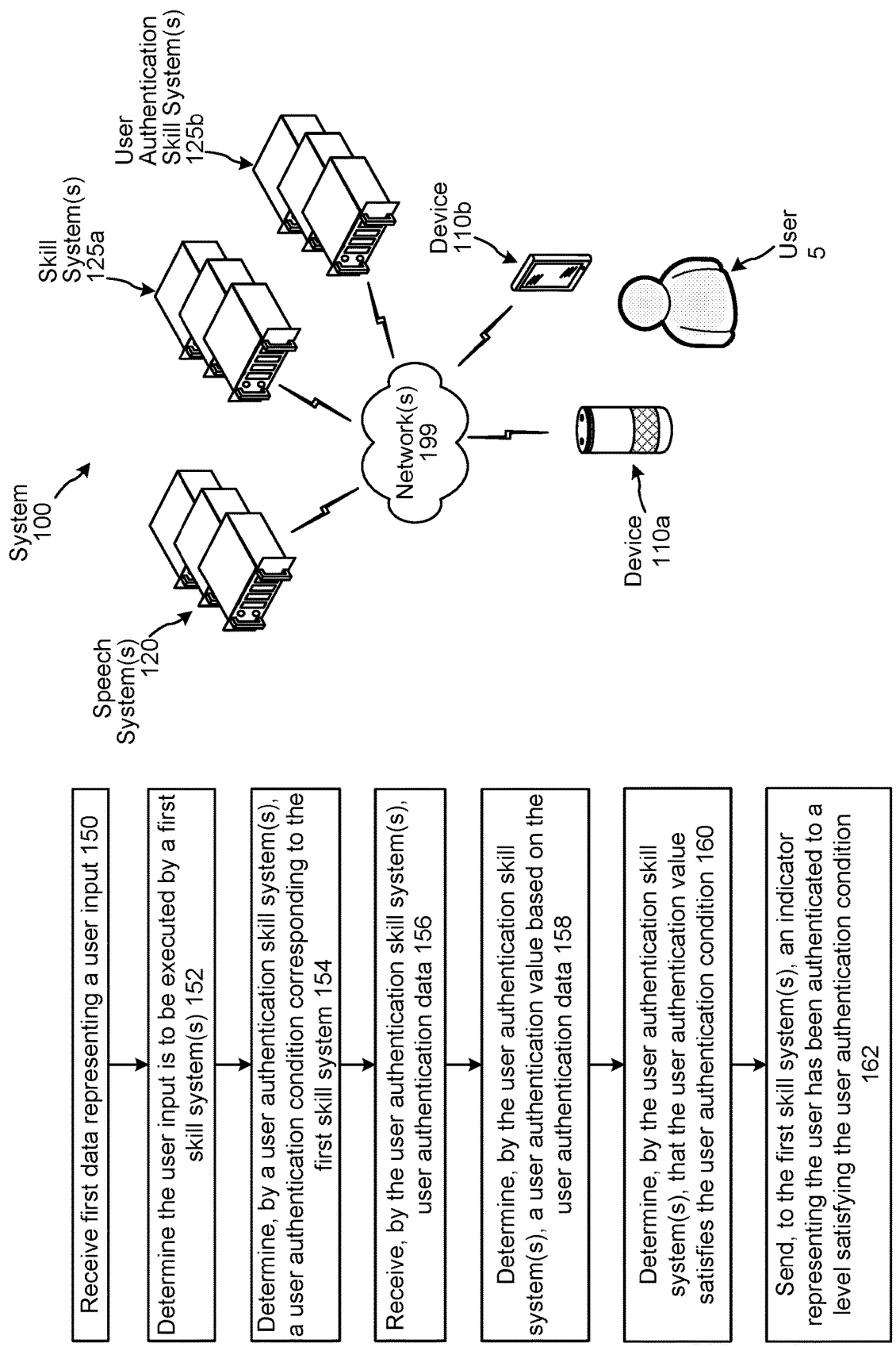
FIG. 1 illustrates a system for adaptably authenticating users, in accordance with embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

A system may be configured to perform actions in response to user inputs. For example, for the user input of "play Adele music," a system may output music sung by an artist named Adele. For further example, for the user input of "turn on the lights," a system may turn on "smart" lights associated with the user's profile.

A system may be configured with skills configured to perform actions in response to user inputs. As used herein, a "skill," and derivations thereof, may refer to software, running on the system, that is akin to a software application running on a traditional computing device. That is, a skill may enable the system to execute specific functionality in order to provide data or produce some other requested output. In at least some examples, a skill is a component that receives data generated by a speech processing system. Such data may be a machine representation of an utterance that was spoken by a user. A skill may process such received data to perform an action. While "skill" and derivatives thereof may be used herein, the functionality described herein as a skill may be referred to using many different terms, such as an action, bot, app, or the like.

A skill may, in at least some examples, require a user be authenticated to at least a threshold level in order for the skill to perform an action. Moreover, in at least some examples, the threshold authentication level required may be tailored to the action to be performed. For example, a banking skill may require a first threshold authentication for a user to access bank branch information, but may require a second, higher threshold authentication for a user to access bank account information.

The present disclosure provides techniques to proactively authenticate a user to a requisite level. In other words, a system according to the present disclosure may perform user authentication to a level required by a skill prior to the skill being invoked to execute with respect to a particular user input. Such may be referred to as implementing user authentication as a service.

In at least some examples, a system of the present disclosure may perform adaptable user authentication. As used herein, "adaptable user authentication" may refer to the selection, of one or more specifically types of user authentication processing, based on data available at the time a present user input is received and processed. In other words, adaptable user authentication may not attempt to perform the same type of authentication with respect to each user input.

The user authentication technique(s) used in any particular instance may be based on a number of different factors. The user authentication technique(s) used may depend upon the source of data a user is trying to access and/or the type of data being accessed. Each source of data and/or type of data may have a threshold confidence associated therewith. The threshold confidence may be used by the system to determine one or more user authentication techniques to use.

The user authentication technique(s) used may additionally or alternatively be selected according to a contextual situation corresponding to the user input. For example, if the user is located within a threshold distance away from a device (capturing or that capture the user input), user authentication techniques involving the analysis of speech captured by a microphone(s) of the device, and/or the analysis of one or more images captured by a camera of the device, may be performed.

The above user authentication techniques, and situations of use, are merely illustrative. As such, one skilled in the art will appreciate that various other user authentication techniques, and combinations thereof, may be used in any particular instance.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 shows a system 100 configured to adaptably authenticate users. Although the figures and discussion illustrate certain operational steps of the system 100 in a particular order, the steps described may be performed in a different order (as well as certain steps removed or added) without departing from the intent of the disclosure. As shown in FIG. 1, the system may include one or more devices (110a/110b) local to a user 5, one or more speech systems 120, and one or more skill systems (125a/125b) connected across one or more networks 199.

The device 110a may receive audio corresponding to a spoken user input originating from the user 5. The device 110a may generate audio data corresponding to the audio and may send the audio data to the speech system(s) 120, which the speech system(s) 120 receives (150).

Alternatively, the device 110b may receive a text-based input from the user 5. The device 110b may generate text data corresponding to the text and may send the text data to the speech system(s) 120, which the system(s) receives (150).

The device (110a/110b) may send the audio data and/or text data to the speech system(s) 120 via a companion application installed on the device (110a/110b). A companion application may enable a device 110 to communicate with the speech system(s) 120 via the network(s) 199. An example companion application is the Amazon Alexa application that may be installed on a smart phone, tablet, or the like.

If the speech system(s) 120 receives audio data at step 150, the speech system(s) 120 may perform speech processing (e.g., ASR processing and NLU processing) on the audio data to determine (152) the user input is to be executed by the skill system(s) 125a (in other words, the skill system(s) 125a is to be invoked to perform an action responsive to the user input). If the speech system(s) 120 receives text data at step 150, the speech system(s) 120 may perform NLU processing on the text data to determine (152) the user input is to be executed by the skill system(s) 125a.

The speech system(s) 120 may send, to the user authentication skill system(s) 125b, a skill identifier corresponding to the skill system(s) 125a. The speech system(s) 120 may also, in at least some examples, send, to the user authentication skill system(s) 125b, an intent indicator corresponding to an NLU intent representing the user input.

The user authentication skill system(s) 125b may communicate with a storage including associations between skill identifiers (and optionally intent indicators) and user authentication conditions (e.g., user authentication threshold values). For example, a skill identifier may be associated with a user authentication condition representing a minimum threshold to which a user must be authenticated in order for the skill system(s) 125a to perform an action responsive to a present user input. For further example, a skill identifier and intent indicator may be associated with a user authentication condition representing a minimum threshold to which a user must be authenticated in order for the skill system(s) 125a to perform action corresponding to the intent indicator. The user authentication skill system(s) 125b may determine (154) a user authentication condition corresponding to the skill identifier (and optionally intent indicator) received from the speech system(s) 120.

The user authentication skill system(s) 125b may select one or more user authentication techniques based on a contextual situation of the user 5. The user authentication skill system(s) 125b may receive data, from various devices local to the user 5, that indicate a "situation" of the user 5. For example, the data may indicate a proximity of the user 5 to the device(s), may indicate whether multiple individuals are located proximate to the device(s), may indicate a noise level of captured audio, a geographic location of a user, etc. If only one individual is within a field of view of a camera of a device, but the individual is located a threshold distance away from the device, the user authentication skill system(s) 125b may determine a speech-based user authentication technique is to be used and/or a an image-based user authentication technique is to be used. If multiple individuals are located proximate to the devices(s) (e.g., as determined by multiple individuals being located within a field of view of the camera(s) or based on multiple individuals' voices being detected in audio data captured by the microphone(s)), the user authentication skill system(s) 125b may select a graphical user interface (GUI) passcode user authentication technique, a biometric user authentication technique, and/or other user authentication technique that may not be overheard/overseen by the other individuals. It will be appreciated that the above examples of determining user authentication techniques are merely illustrative, and that other user authentication techniques, and combinations thereof, may be determined based on various other situations and/or circumstances.

Each user authentication technique may be associated with one or more devices capable of capturing data used to perform the respective user authentication technique. Each particular pairing of a user authentication technique and associated device may be associated with a maximum possible weighted user authentication value. The user authentication skill system(s) 125b may determine a single user authentication technique and associated device capable of generating a weighted user authentication value that satisfies the user authentication condition determined at step 154. Alternatively, the user authentication skill system(s) 125b may determine multiple user authentication techniques and associated devices that, when their respective weighted user authentication values are considered together, satisfy the user authentication condition determined at step 154. Weighted user authentication values may be combined using various techniques as described below and as known in the art.

The user authentication skill system(s) 125b may determine the user authentication technique(s) and associated device(s) based on the device 110 from which the data, representing the user input, was received. The device 110 (and more particularly the device 110's device identifier) may be associated with a profile corresponding to one or more other device identifiers, each being associated with respective user authentication techniques. For example, a profile may be associated with a device identifier corresponding to a device that may capture audio and/or image data (e.g., for performing audio-based and/or image-based user authentication), a device identifier corresponding to a wearable device (e.g., a smart watch) that may capture a pulse (e.g., for performing biometric user authentication), a device identifier corresponding to a fingerprint scanner (e.g., for performing biometric user authentication), a device identifier corresponding to retina scanner (e.g., for performing biometric user authentication), a device identifier corresponding to a device including a keyboard that may capture a password (e.g., for performing password user authentication), a device identifier corresponding to a sensor for waiving a dongle in front of, etc. As such, the user authentication skill system(s) 125b may determine the user authentication technique(s) and associated device(s) based on the devices (and more particularly the device identifiers) represented in the profile with which the device 110's device identifier is associated.

After the user authentication skill system(s) 125b has determined the one or more user authentication techniques, the user authentication skill system(s) 125b may receive (156) user authentication data, corresponding to the user authentication technique(s), from corresponding devices. The authentication skill system(s) 125b may determine (158) a user authentication value based on the received user authentication data. The user authentication value may be a numeric value (e.g., within a scale of 0-10, 0-100, 0-1000, or some other scale). Alternatively, the user authentication value may be a binned value (e.g., low, medium, high, etc.) A binned user authentication value may correspond to a range of numeric user authentication values (e.g., low may corresponding to 0-3, medium may corresponding to 4-6, and high may correspond to 7-10).

The authentication skill system(s) 125b may determine (160) the user authentication value satisfies the user authentication condition determined at step 154. In an example, the authentication skill system(s) 125b may determine the user authentication value satisfies (e.g., exceeds, or meets or exceeds) a threshold user authentication value.

After determining the user authentication value satisfies the user authentication condition, the authentication skill system(s) 125b may send (162), to the skill system(s) 125a, an indicator representing the user has been authenticated to a level satisfying the user authentication condition. Such sending of the indicator may or may not involve using the speech system(s) 120 as an intermediary. In at least some examples, the indicator may include the user authentication value determined at step 158.

A user authentication condition, associated with a particular skill identifier (and optionally intent indicator), may be set by the skill system(s) 125 corresponding to the skill identifier. Alternatively, in at least some examples, a user authentication condition, associated with a particular skill identifier (and optionally intend indicator), may be sent by the user 5. For example, a user profile (corresponding to the user 5 and described in detail herein) may include data indicating access to a particular kind of data, or processes performable by a particular skill, may require the user be authenticated to a particular level. In at least some examples, the user profile may further indicate the particular user authentication technique(s) to be used in a particular situation.

Figure 2:
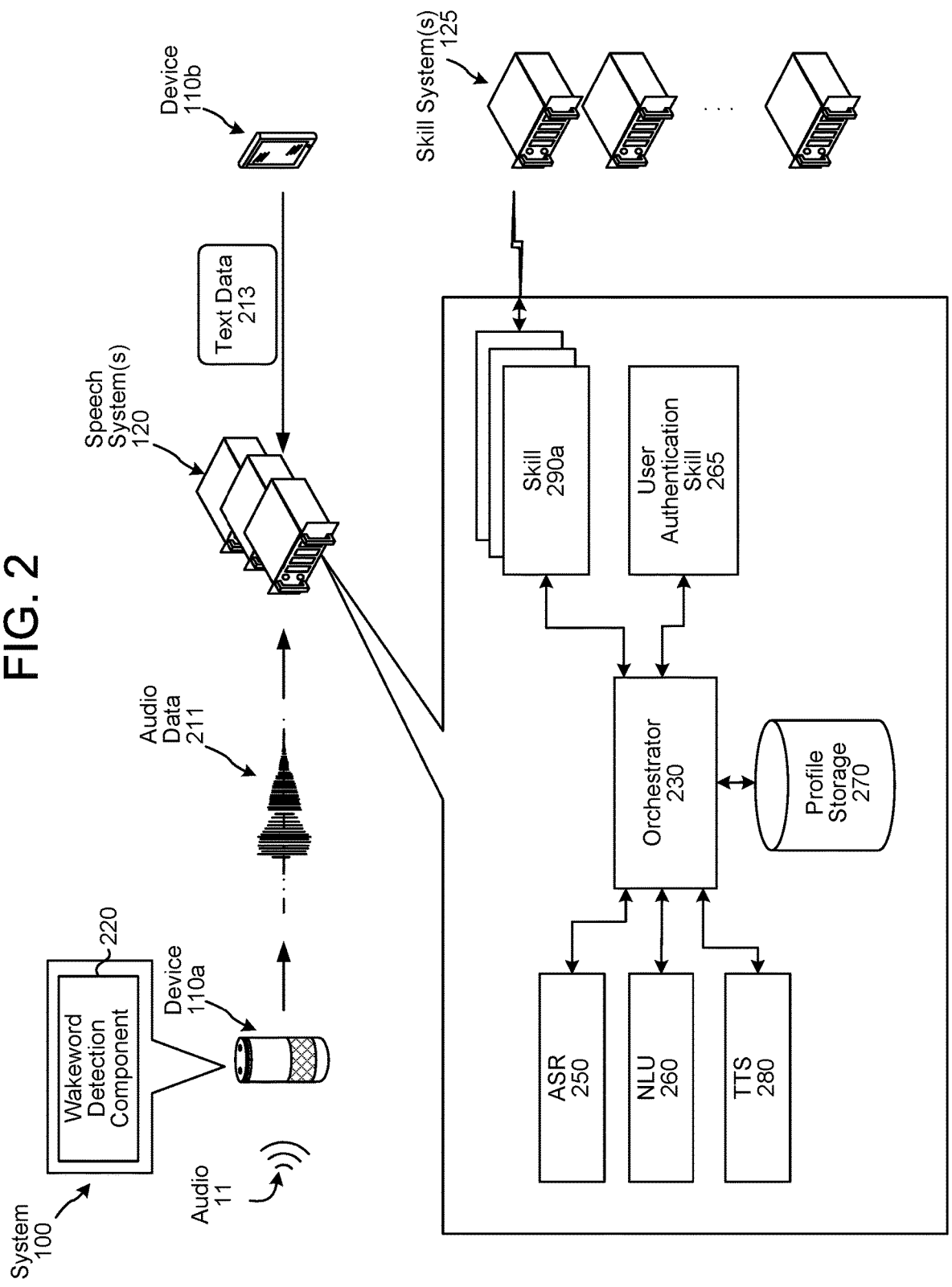
FIG. 2 is a conceptual diagram of components of a system, in accordance with embodiments of the present disclosure.

Further details of the system 100 configured to adaptably and proactively authenticate users are explained below, following a discussion of the overall system of FIG. 2. The various components may be located on same or different physical devices. Communication between various components may occur directly or across a network(s) 199.

An audio capture component(s), such as a microphone or array of microphones of the device 110a, captures audio 11. The device 110a processes audio data, representing the audio 11, to determine whether speech is detected. The device 110a may use various techniques to determine whether audio data includes speech. In some examples, the device 110a may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110a may implement a limited classifier configured to distinguish speech from background noise. The classifier may be implemented by techniques such as linear classifiers, support vector machines, and decision trees. In still other examples, the device 110a may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110a may use a wakeword detection component 220 to perform wakeword detection to determine when a user intends to speak an input to the speech system(s) 120. An example wakeword is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110a may "wake" and begin transmitting audio data 211, representing the audio 11, to the speech system(s) 120. The audio data 211 may include data corresponding to the wakeword, or the device 110a may remove the portion of the audio corresponding to the wakeword prior to sending the audio data 211 to the speech system(s) 120.

An orchestrator component 230 may receive the audio data 211. The orchestrator component 230 may include memory and logic that enables the orchestrator component 230 to transmit various pieces and forms of data to various components of the system, as well as perform other operations.

The orchestrator component 230 sends the audio data 211 to an ASR component 250. The ASR component 250 transcribes the audio data 211 into text data. The text data output by the ASR component 250 represents one or more than one (e.g., in the form of an n-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 outputs text data representing one or more ASR hypotheses. The text data output by the ASR component 250 may include a top scoring ASR hypothesis or may include an n-best list of ASR hypotheses. Each ASR hypothesis may be associated with a respective score. Each score may indicate a confidence of ASR processing performed to generate the ASR hypothesis with which the score is associated.

The device 110b may receive a text-based user input. The device 110b may generate text data 213 representing the text-based user input. The device 110a may send the text data 213 to the speech system(s) 120. The orchestrator component 230 may receive the text data 213.

The orchestrator component 230 may send text data (e.g., text data output by the ASR component 250 or the received text data 213) to an NLU component 260.

The NLU component 260 attempts to make a semantic interpretation of the phrase(s) or statement(s) represented in the received text data. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device 110, the speech system(s) 120, a skill 290, a skill system(s) 125, etc.) to execute the intent. For example, if the text data corresponds to "play Adele music," the NLU component 260 may determine an intent that the speech system(s) 120 output music and may identify "Adele" as an artist. For further example, if the text data corresponds to "what is the weather," the NLU component 260 may determine an intent that the speech system(s) 120 output weather information associated with a geographic location of the device 110. In another example, if the text data corresponds to "turn off the lights," the NLU component 260 may determine an intent that the speech system(s) 120 turn off lights associated with the device(s) 110 or the user(s) 5. The NLU component 260 may output NLU results data (which may include tagged text data, indicators of intent, etc.).

As described above, the speech system(s) 120 may perform speech processing using two different components (e.g., the ASR component 250 and the NLU component 260). One skilled in the art will appreciate that the speech system(s) 120, in at least some implementations, may implement a spoken language understanding (SLU) component that is configured to process audio data 211 to generate NLU results data.

In some examples, the SLU component may be equivalent to the ASR component 250 and the NLU component 260. For example, the SLU component may process audio data 211 and generate NLU data. The NLU data may include intent data and/or slot data so that directives may be determined based on the intent data and/or the slot data. While the SLU component may be equivalent to a combination of the ASR component 250 and the NLU component 260, the SLU component may process audio data 211 and directly generate the NLU data, without an intermediate step of generating text data (as does the ASR component 250). As such, the SLU component may take audio data 211 representing speech and attempt to make a semantic interpretation of the speech. That is, the SLU component may determine a meaning associated with the speech and then implement that meaning. For example, the SLU component may interpret audio data 211 representing speech from the user 5 in order to derive an intent or a desired action or operation from the user 5. In some examples, the SLU component outputs a most likely NLU response (e.g., hypothesis) recognized in the audio data 211, or multiple hypotheses in the form of a lattice or an N-best list with individual hypotheses corresponding to confidence scores or other scores (such as probability scores, etc.).

The speech system(s) 120 may include one or more skills 290. A "skill" may be software running on the speech system(s) 120 that is akin to a software application running on a traditional computing device. That is, a skill 290 may enable the speech system(s) 120 to execute specific functionality in order to provide data or produce some other requested output. The speech system(s) 120 may be configured with more than one skill 290. For example, a weather service skill may enable the speech system(s) 120 to provide weather information, a car service skill may enable the speech system(s) 120 to book a trip with respect to a taxi or ride sharing service, a restaurant skill may enable the speech system(s) 120 to order a pizza with respect to the restaurant's online ordering system, etc. A skill 290 may operate in conjunction between the speech system(s) 120 and other devices, such as the device 110, in order to complete certain functions. Inputs to a skill 290 may come from speech processing interactions or through other interactions or input sources. A skill 290 may include hardware, software, firmware, or the like that may be dedicated to a particular skill 290 or shared among different skills 290.

In addition or alternatively to being implemented by the speech system(s) 120, a skill 290 may be implemented by a skill system(s) 125. Such may enable a skill system(s) 125 to execute specific functionality in order to provide data or perform some other action requested by a user.

Skills may be associated with different domains, such as smart home, music, video, flash briefing, shopping, and custom (e.g., skills not associated with any pre-configured domain).

The speech system(s) 120 may be configured with a single skill 290 dedicated to interacting with more than one skill system(s) 125.

Unless expressly stated otherwise, reference herein to a "skill," or a derivative thereof, may include a skill 290 operated by the speech system(s) 120 and/or skill operated by a skill system(s) 125. Moreover, the functionality described herein as a skill may be referred to using many different terms, such as an action, bot, app, or the like.

The speech system(s) 120 may include a TTS component 280. The TTS component 280 may generate audio data (e.g., synthesized speech) from text data using one or more different methods. Text data input to the TTS component 280 may come from a skill 290, the orchestrator component 230, or another component of the speech system(s) 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The speech system(s) 120 may include a user authentication skill 265. The user authentication skill 265 may be implemented by the speech system(s) 120, or may be implemented by the user authentication skill system(s) 125b.

Figure 3:
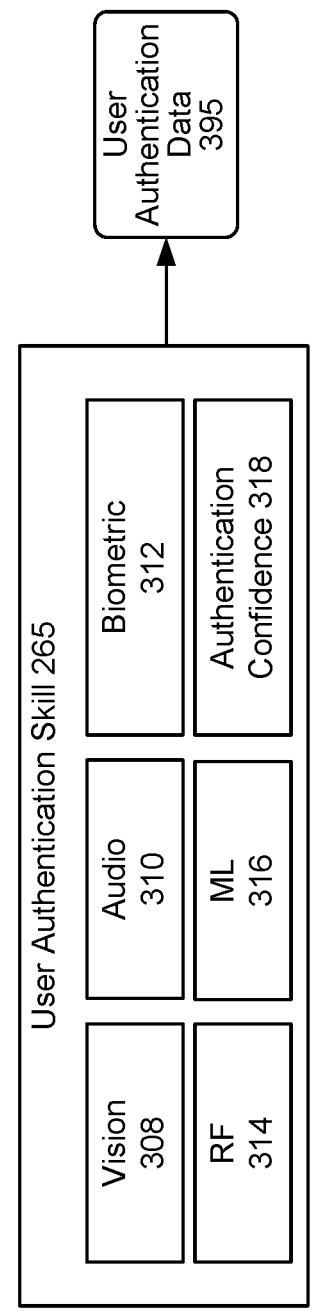
FIG. 3 is a schematic diagram of an illustrative architecture in which sensor data is combined to authenticate one or more users, in accordance with embodiments of the present disclosure.

The user authentication skill 265 may authenticate one or more users using a variety of data. As illustrated in FIG. 3, the user authentication skill 265 may include one or more subcomponents including a vision component 308, an audio component 310, a biometric component 312, a radio frequency (RF) component 314, a machine learning (ML) component 316, and an authentication confidence component 318. In some instances, the user authentication skill 265 may monitor data and determinations from one or more subcomponents to authenticate an identity of one or more users associated with data input to the speech system(s) 120. The user authentication skill 265 may output user authentication data 395, which may include a user identifier associated with a user the user authentication skill 265 believes originated data input to the speech system(s) 120. The user authentication skill 265 may be used to inform processes performed by various components of the speech system(s) 120.

The vision component 308 may receive data from one or more sensors capable of providing images (e.g., cameras) or sensors indicating motion (e.g., motion sensors). The vision component 308 can perform facial recognition or image analysis to determine an identity of a user and to associate that identity with a user profile associated with the user. In some instances, when a user is facing a camera, the vision component 308 may perform facial recognition and identify the user with a high degree of confidence. In other instances, the vision component 308 may have a low degree of confidence of an identity of a user, and the user authentication skill 265 may utilize determinations from additional components to determine an identity of a user. The vision component 308 can be used in conjunction with other components to determine an identity of a user. For example, the user authentication skill 265 may use data from the vision component 308 with data from the audio component 310 to identify what user's face appears to be speaking at the same time audio is captured by a device 110 the user is facing for purposes of identifying a user who spoke an input to the speech system(s) 120.

The overall system of the present disclosure may include biometric sensors that transmit data to the biometric component 312. For example, the biometric component 312 may receive data corresponding to fingerprints, iris or retina scans, thermal scans, weights of users, a size of a user, pressure (e.g., within floor sensors), etc., and may determine a biometric profile corresponding to a user. The biometric component 312 may distinguish between a user and sound from a television, for example. Thus, the biometric component 312 may incorporate biometric information into a confidence level for determining an identity of a user. Biometric information output by the biometric component 312 can be associated with specific user profile data such that the biometric information uniquely identifies a user profile of a user.

The RF component 314 may use RF localization to track devices that a user may carry or wear. For example, a user (and a user profile associated with the user) may be associated with a device. The device may emit RF signals (e.g., Wi-Fi, Bluetooth®, etc.). A device may detect the signal and indicate to the RF component 314 the strength of the signal (e.g., as a received signal strength indication (RSSI)). The RF component 314 may use the RSSI to determine an identity of a user (with an associated confidence level). In some instances, the RF component 314 may determine that a received RF signal is associated with a mobile device that is associated with a particular user identifier.

In some instances, a device 110 may include some RF or other detection processing capabilities so that a user who speaks an input may scan, tap, or otherwise acknowledge his/her personal device (such as a phone) to the device 110. In this manner, the user may "register" with the speech system(s) 120 for purposes of the speech system(s) 120 determining who spoke a particular input. Such a registration may occur prior to, during, or after speaking of an input.

The ML component 316 may track the behavior of various users as a factor in determining a confidence level of the identity of the user. By way of example, a user may adhere to a regular schedule such that the user is at a first location during the day (e.g., at work or at school). In this example, the ML component 316 would factor in past behavior and/or trends in determining the identity of the user that provided input to the speech system(s) 120. Thus, the ML component 316 may use historical data and/or usage patterns over time to increase or decrease a confidence level of an identity of a user.

In at least some instances, the authentication confidence component 318 receives determinations from the various components 308, 310, 312, 314, and 316, and may determine a final confidence level associated with the identity of a user. In some instances, the confidence level may determine whether an action is performed in response to a user input. For example, if a user input includes a request to unlock a door, a confidence level may need to be above a threshold that may be higher than a threshold confidence level needed to perform a user request associated with playing a playlist or sending a message. The confidence level or other score data may be included in the user authentication data 395.

The audio component 310 may receive data from one or more sensors capable of providing an audio signal (e.g., one or more microphones) to facilitate authentication of a user. The audio component 310 may perform audio recognition on an audio signal to determine an identity of the user and associated user identifier. In some instances, aspects of the speech system(s) 120 may be configured at a computing device (e.g., a local server). Thus, in some instances, the audio component 310 operating on a computing device may analyze all sound to facilitate authentication of a user. In some instances, the audio component 310 may perform voice recognition to determine an identity of a user.

The audio component 310 may also perform user identification based on audio data 211 input into the speech system(s) 120 for speech processing. The audio component 310 may determine scores indicating whether speech in the audio data 211 originated from particular users. For example, a first score may indicate a likelihood that speech in the audio data 211 originated from a first user associated with a first user identifier, a second score may indicate a likelihood that speech in the audio data 211 originated from a second user associated with a second user identifier, etc. The audio component 310 may perform user authentication by comparing speech characteristics represented in the audio data 211 to stored speech characteristics of users (e.g., stored voice profiles associated with the device 110 that captured the spoken user input).

Figure 4:
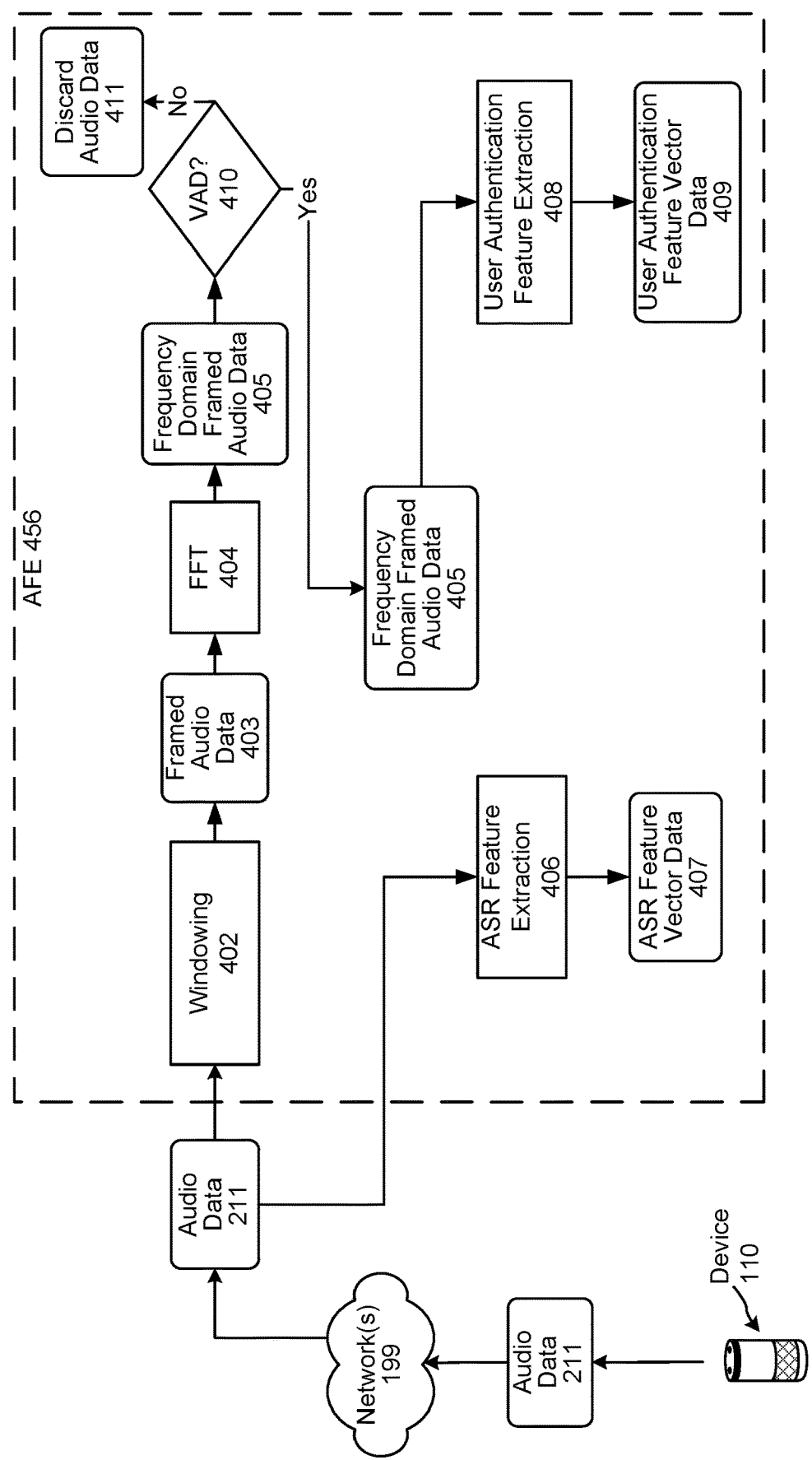
FIG. 4 is a flow diagram illustrating processing performed to prepare audio data for ASR processing and user authentication processing, in accordance with embodiments of the present disclosure.

FIG. 4 illustrates processing performed to prepare audio data for ASR processing and user authentication processing. As described, the device 110 sends audio data 211 through a network(s) 199 to the speech system(s) 120 for processing. The speech system(s) 120 may include an acoustic front end (AFE) 456 (or other component(s)) that performs various functions on the audio data 211 to prepare the audio data 211 for further downstream processing, such as ASR processing and/or user authentication processing. For example, the AFE 456 may perform (402) windowing functions on the audio data 211 to create framed audio data 403 (e.g., waveforms). The size of each frame may depend upon implementation. In an example, each frame may include twenty-five (25) milliseconds (m/s) of audio data, with an overlap of the next frame of 10 ms of data, thus resulting in sliding window processing of audio data. Performing a windowing function may include multiplying a time record by a finite-length window with an amplitude that varies smoothly and gradually toward zero at its edges. By performing such, the endpoints of the waveforms of respective frames of audio data meet, resulting in a continuous waveform without sharp transitions. The AFE 456 may then perform (404) a fast Fourier transform (FFT) that converts the waveforms in each frame of the framed audio data 403 from its original domain (e.g., time) to a representation in a frequency domain (thereby creating frequency domain framed audio data 405). Audio processing techniques other than or in addition to FFT may be used to transform audio data (e.g., waveforms) into data that can be processed as needed.

The speech system(s) 120 (through the AFE 456 or using another component) then detects (410) whether voice activity (i.e., speech) is present in the post-FFT waveforms (i.e., frequency domain framed audio data 405). In doing so, the speech system(s) 120 may perform VAD operations discussed above. The VAD detector 410 (or other components) may also be configured in a different order, for example the VAD detector 410 may operate on audio data 211 rather than on frequency domain framed audio data 405, may operate on ASR features, etc. Various different configurations of components are possible. If there is no speech in the audio data, the speech system(s) 120 discards (411) the frequency domain framed audio data 405 (i.e., removes the audio data from the processing stream). If, instead, the speech system(s) 120 detects speech in the frequency domain framed audio data 405, the speech system(s) 120 performs user authentication feature extraction (408) on the frequency domain framed audio data 405. User authentication feature extraction (408) may include performing frame level feature extraction and/or utterance level feature extraction. The frame level feature extraction may determine which frame of a universal background model (UBM) the frame corresponds to. The UBM may be a Gaussian mixture model, a deep neural network, etc. The utterance level feature extraction may analyze aligned speech frames to derive feature vectors of fixed length (i.e., the user authentication feature vector data 409). The feature extraction may continue until voice activity is no longer detected in the audio data, at which point the speech system(s) 120 may determine that an endpoint of the speech has been reached.

ASR feature extraction (406) may be performed on all the audio data 211 received from the device 110. Alternatively (not illustrated), ASR feature extraction (406) may only be performed on audio data including speech (as indicated by the VAD 410). ASR feature extraction (406) and/or user authentication feature extraction (408) involve determining values (i.e., features) representing qualities of the frequency domain framed audio data 405, along with quantitating those features into values (i.e., feature vectors or audio feature vectors). ASR feature extraction (406) may determine ASR feature vector data 407 useful for ASR processing, and user authentication feature extraction (408) may determine user authentication feature vector data 409 (sometimes called an i-vector) useful for user authentication. The ASR feature vector data 407 and the user authentication feature vector data 409 may be the same feature vectors, different feature vectors, or may include some overlapping feature vectors. A number of approaches may be used to extract feature vectors from the frequency domain framed audio data 405, such as MFCCs, PLP techniques, neural network feature vector techniques, linear discriminant analysis, semi-tied covariance matrices, or other approaches known to those skilled in the art.

ASR feature vector data 407 may include a different audio feature vector for each audio frame. Thus, for one 25 ms long audio frame, the ASR feature extraction component 406 may output a single ASR feature vector. The ASR feature vectors 407 output by the ASR feature extraction component 406 may be output to the ASR component 250.

Depending on system configuration, the user authentication feature extraction component 408 may output multiple user authentication feature vectors, for example one such vector for each audio frame. Alternatively, the user authentication feature extraction component 408 may continue to input the frequency domain framed audio data 405 while the utterance is ongoing (e.g., before the endpoint of the speech is reached in the audio data 405). While the audio data 405 for the utterance is input, the user authentication feature extraction component 408 may accumulate or otherwise combine the audio data 405 as it comes in. That is, for a certain frame's worth of audio data 405 that comes in, the user authentication feature extraction component 408 may combine that frame's worth of data to the previous data received for the particular utterance. The particular method of accumulation may vary, including using an arithmetic component, a recurrent neural network (RNN), trained model, or other component capable of combining audio data. Further, the form of combination performed by the user authentication feature extraction component 408 may depend on what audio qualities are determined to be important for ultimate user recognition. Thus, the user authentication feature extraction component 408 may be trained to isolate and process data that is most useful for user authentication. The output of the user authentication feature extraction component 408 may thus include user authentication feature vector data 409 that includes values for features useful for user authentication. The resulting user authentication feature vector data 409 may then be used for user authentication.

Figure 5:
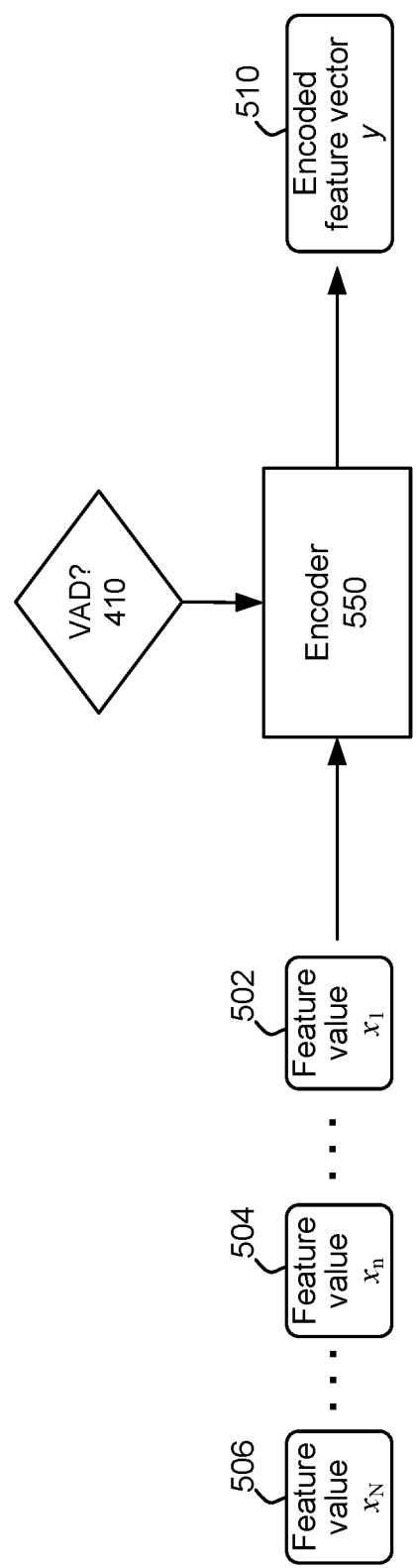
FIG. 5 is a diagram of a vector encoder, in accordance with embodiments of the present disclosure.

The user authentication feature vector data 409 may include multiple vectors each corresponding to different portions of the utterance. Alternatively, the user authentication feature vector data 409 may be a single vector representing audio qualities of the utterance. Referring to FIG. 5, the single vector may be created using an encoder 550 which can create a fixed-size vector to represent certain characteristics of the audio data entities as described below. In mathematical notation, given a sequence of feature data values $x_1, \ldots x_n, \ldots x_N$, with $x_n$ being a D-dimensional vector, an encoder $E(x_1, \ldots x_N) = y$ projects the feature sequence toy, with y being a F-dimensional vector. F is a fixed length of the vector and is configurable depending on use of the encoded vector and other system configurations. As shown in FIG. 5, feature values 502 through 506 (which may include feature vectors of audio data 211, frequency domain framed audio data 405, or the like) may be input into an encoder 550 which will output an encoded feature vector 510 that represents the input feature values. The VAD 410 may be an input into the encoder 550 such that the encoder 550 may only operate when feature values input therein correspond to speech. The individual feature values (e.g., 502-506) may correspond to specific audio frames. Regardless of how many feature values are input, any particular encoder 550 will be configured to output vectors of the same size, thus ensuring a continuity of output encoded vector size from any particular encoder 550 (though different encoders may output vectors of different fixed sizes) and enabling comparing different feature vectors y. The value y may be called an embedding of the sequence $x_1, \ldots x_N$. The length of $x_n$ and y are fixed and known a-priori, but the length of N of feature sequence $x_1, \ldots x_N$ is not necessarily known a-priori. The encoder 550 may be implemented as a neural network (NN), recurrent neural network (RNN), GMM, or other model. One particular example is a long short-term memory (LSTM) RNN. There are a variety of ways for the encoder 550 to consume the encoder input, including but not limited to:

- linear, one direction (forward or backward),
- bi-linear, essentially the concatenation of a forward and a backward embedding, or
- tree, based on parse-tree of the sequence.

In addition, an attention model can be used, which is another RNN or deep neural network (DNN) that learns to "attract" attention to certain parts of the input. The attention model can be used in combination with the above methods of consuming the input.

FIG. 5 illustrates operation of the encoder 550. The input feature value sequence, starting with feature value $x_1$ 502, continuing through feature value $x_n$ 504, and concluding with feature value $x_N$ 506 is input into the encoder 550. The encoder 550 may process the input feature values as noted above. The encoder 550 outputs the encoded feature vector y 510, which is a fixed length feature vector of length F. Thus, the user authentication feature extraction component 408 may include an encoder 550 that receives audio feature values for a particular utterance as input, and outputs a fixed length encoded feature vector y 510, which may be the user authentication feature/vector data 409. Thus, in certain system configurations, no matter how long the utterance is, or how many acoustic frames worth of feature values are input into the encoder 550, the output feature vector 510/409 will be of the same length, thus allowing for more ease of performing user recognition by the user authentication skill 295. To allow for robust system operation, a final vector 409 may include many dimensions (e.g., several hundred), thus providing many datapoints for downstream consideration.

To determine the user authentication feature vector data 409, the system may (for example using the VAD detector 410) determine that voice activity is detected in input audio. This may indicate the beginning of the utterance, thus resulting in the system determining that the input utterance starts at a first point in audio data. Audio processing (for example by windowing 402, FFT 404, ASR feature extraction 406, user authentication feature extraction 408, ASR processing, or the like) may continue on the utterance audio data starting at the first point and continuing until the VAD detector 410 determines that voice activity is no longer detected at a second point in audio data. Thus, the system may determine that the input utterance ends at the second point. Thus, the first point may be considered the beginpoint of the utterance and the second point may be considered the endpoint of the utterance. The VAD detector 410, or other component, may signal the user authentication feature extraction component 408 when the beginpoint and/or endpoint is detected so that the user authentication feature extraction component 408 may begin processing audio data starting at the beginpoint and ending at the endpoint. Further, audio frames during the utterance that do not include speech may be filtered out by the VAD detector 410 and thus not considered by the ASR feature extraction component 406 and/or user authentication feature extraction component 408. The resulting accumulated/processed speech audio data for the utterance (from beginpoint to endpoint) may then be represented in a single feature vector for the user authentication feature vector data 409, which may then be used for user authentication.

Figure 6:
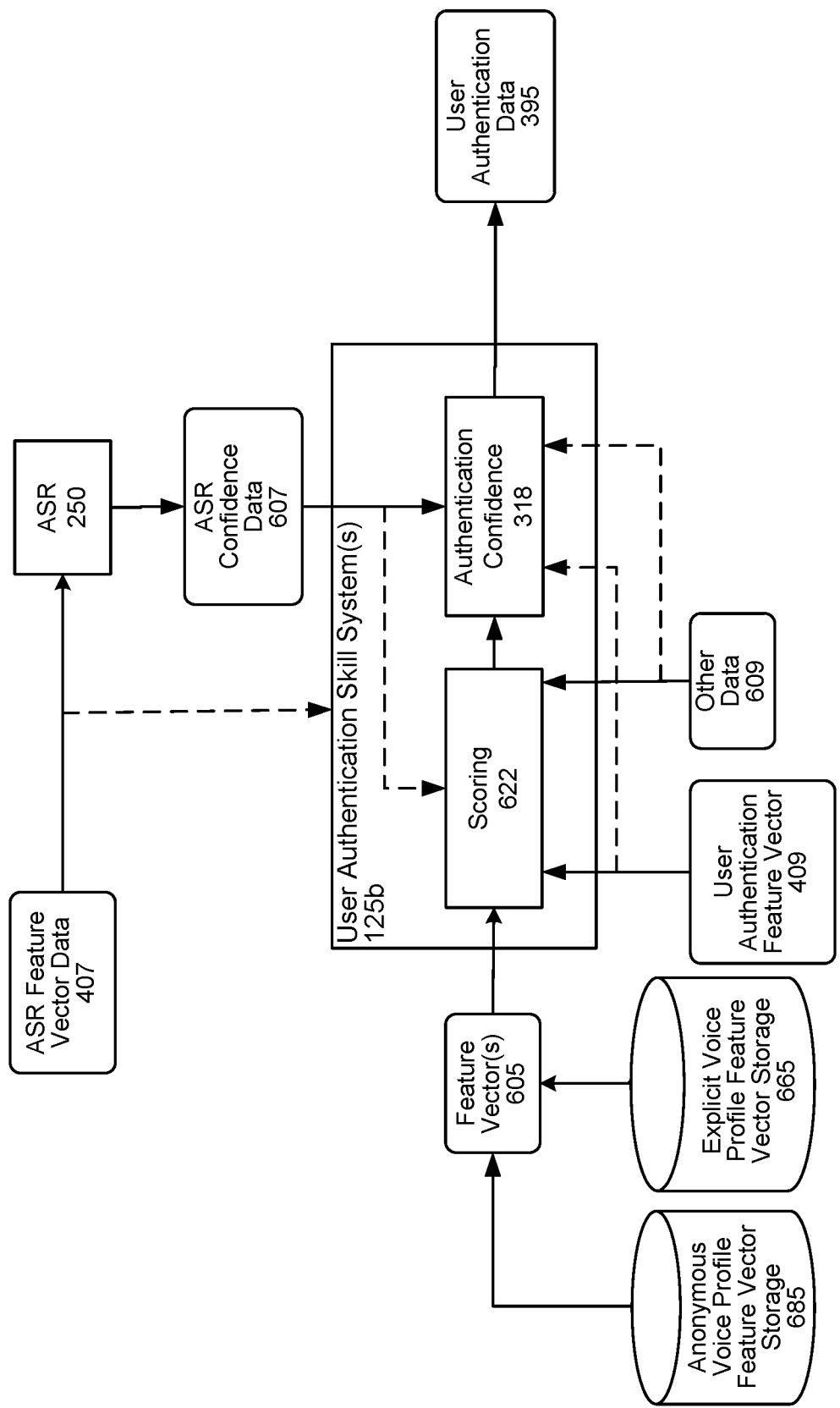
FIG. 6 is a system flow diagram illustrating user authentication processing, in accordance with embodiments of the present disclosure.
Figure 7E:
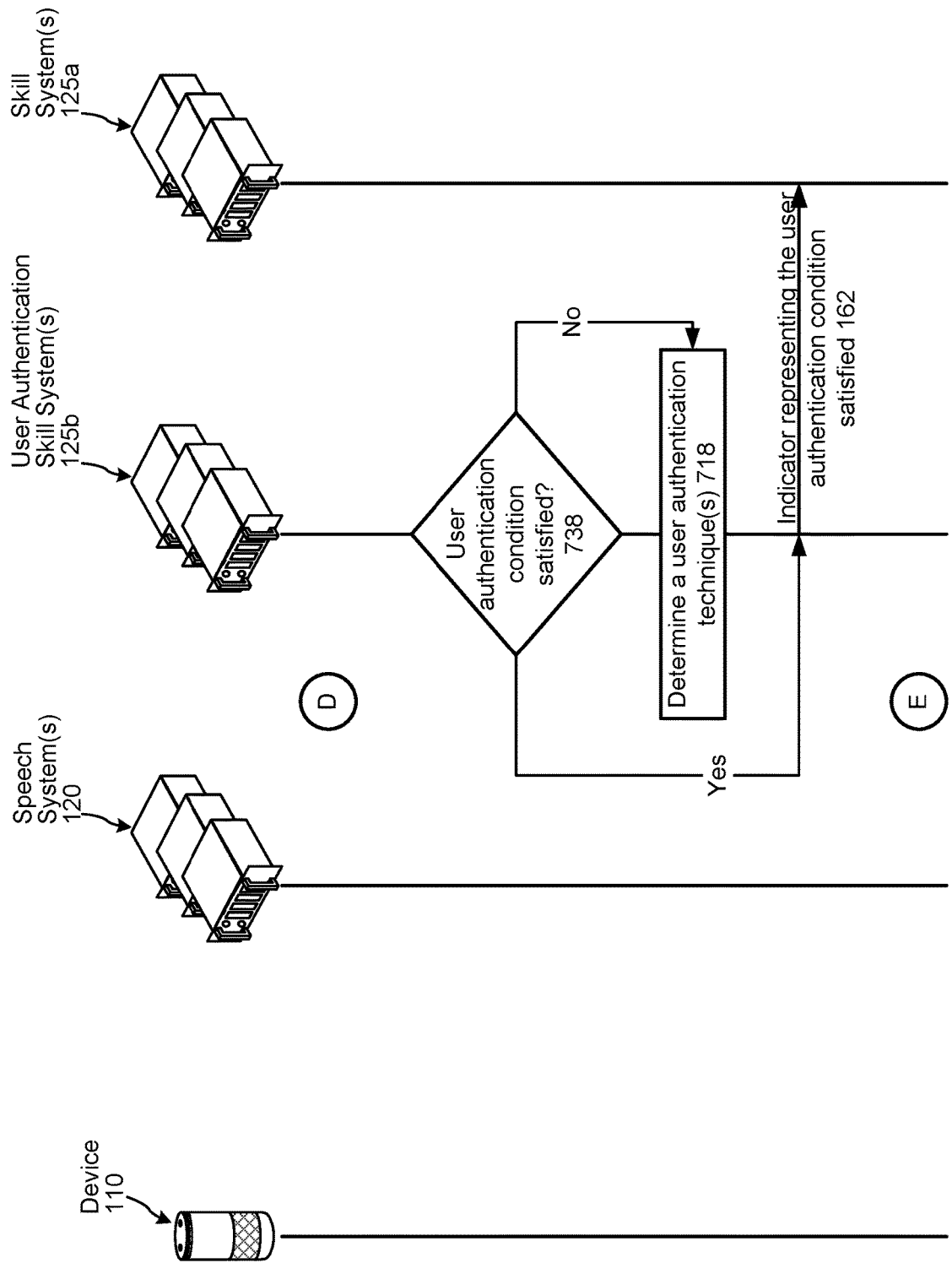

FIG. 6 illustrates user authentication as performed by the user authentication skill system(s) 125b (or user authentication skill 265). The ASR component 250 performs ASR on the ASR feature vector data 407 as described above. ASR confidence data 607 is passed to a user authentication skill system(s) 125b.

The user authentication skill system(s) 125b performs user authentication using various data including the user authentication feature vector data 409, feature vectors 605 representing explicit and/or anonymous voice profiles, the ASR confidence data 607, and other data 609. The user authentication skill system(s) 125b may then output user authentication confidence data 395, which reflects a certain confidence that the user input was spoken by one or more particular users. The user authentication confidence data 395 may include one or more user identifiers, one or more user profile identifiers, one or more explicit voice profile identifiers, and/or one or more anonymous voice profile identifiers. Each identifier in the user authentication confidence data 395 may be associated with a respective confidence value, representing a likelihood that the user input corresponds to the identifier. A confidence value may be a numeric or binned value as discussed herein.

A system may be configured to identify a user based on the user explicitly enrolling in the system's user authentication functionality. For example, a user may initiate an enrollment process in which the user speaks utterances requested by the system, such as repeating a wakeword a number of times, reading a series of short phrases, or repeating a series of words as requested by the system. The system may generate audio data from the speech and generate a voice profile representing the user's speech from the audio data. The system may associate the voice profile with a user identifier of a known user. A known user is a user that has voluntarily provided the system with various additional personally-identifiable information (e.g., a name, user name, email address, phone number, etc.). A voice profile associated with a known user identifier may be referred to herein as an explicit voice profile.

A user may provide a system with permission to generate voice profiles for one or more users that interact with a device or group of devices (e.g., devices associated with a particular household). After receiving such permission and when a user input is received by the device(s), the system may determine speech characteristics representing the user input. The system may cluster user inputs associated with similar speech characteristics. For example, a single user may speak various inputs to a device(s) after the system receives permission to generate voice profiles for one or more users that interact with the device(s). Even though the user's inputs may be substantively different (e.g., may request the system perform different actions), the different inputs of the user may have similar or identical speech characteristics (e.g., pitch, tone, etc.). Thus, when the system generates a voice profile by clustering the user inputs having the same or similar speech characteristics, the system is effectively generating a voice profile specific to a user even though the system does not know which user provided the inputs. This type of voice profile may be referred to as an anonymous voice profile.

The feature vector(s) 605 input to the user authentication skill system(s) 125b may correspond to one or more anonymous voice profiles (stored in anonymous voice profile feature vector storage 685) and/or one or more explicit voice profiles (stored in explicit voice profile feature vector storage 665). The user authentication skill system(s) 125b may use the feature vector(s) 605 to compare against the user authentication feature vector 409, representing the present user input, to determine whether the user authentication feature vector 409 corresponds to one or more of the feature vectors 605 of the anonymous and/or explicit voice profiles.

Each feature vector 605 may be the same size as the user authentication feature vector 409. Thus, for example, if the user authentication feature vector 409 is of size F (for example encoded by the encoder 550), a feature vector 605 may also be of size F.

To perform user authentication, the user authentication skill system(s) 125b may determine the device 110 from which the audio data 211 originated. For example, the audio data 211 may be associated with metadata including a device identifier representing the device 110. Either the device 110 or the speech system(s) 120 may generate the metadata. The speech system(s) 120 may determine a group profile identifier associated with the device identifier, may determine user profile identifiers associated with the group profile identifier, and may include the group profile identifier and/or the user profile identifiers in the metadata. The speech system(s) 120 may associate the metadata with the user authentication feature vector 409 produced from the audio data 211. The user authentication skill system(s) 125b may send a signal to the anonymous voice profile feature vector storage 685 and/or the explicit voice profile feature vector storage 665, with the signal requesting only feature vectors 605 associated with the device identifier, the group profile identifier, and/or the user profile identifiers represented in the metadata. This limits the universe of possible feature vectors 605 the user authentication skill system(s) 125b should consider at runtime and thus decreases the amount of time to perform user authentication by decreasing the amount of feature vectors 605 needed to be processed. Alternatively, the user authentication skill system(s) 125b may access all (or some other subset of) feature vectors 605 available to the user authentication skill system(s) 125b. However, accessing all feature vectors 605 will likely increase the amount of time needed to perform user recognition based on the magnitude of feature vectors to be processed.

The user authentication skill system(s) 125b may attempt to identify the user that spoke the speech represented in the audio data 211 by comparing the user authentication feature vector 409 to the received feature vector(s) 605. The user authentication skill system(s) 125b may include a scoring component 622 that determines respective scores indicating whether the user input (represented by the user authentication feature vector 409) was spoken by one or more particular users (represented by the feature vector(s) 605). The user authentication skill system(s) 125b may also include a confidence component 318 that determines an overall accuracy of user authentication operations (such as those of the scoring component 622) and/or an individual confidence value with respect to each user potentially identified by the scoring component 622. The output from the scoring component 622 may include a different confidence value for each received feature vector 605. For example, the output may include a first confidence value for a first feature vector (representing a first anonymous or explicit voice profile), a second confidence value for a second feature vector (representing a second anonymous or explicit voice profile), etc. Although illustrated as two separate components, the scoring component 622 and confidence component 318 may be combined into a single component or may be separated into more than two components.

The scoring component 622 and confidence component 318 may implement one or more trained machine learning models (such neural networks, classifiers, etc.) as known in the art. For example, the scoring component 622 may use probabilistic linear discriminant analysis (PLDA) techniques. PLDA scoring determines how likely it is that the user authentication feature vector 409 corresponds to a particular feature vector 605. The PLDA scoring may generate a confidence value for each feature vector 605 considered and may output a list of confidence values associated with respective user profile identifiers, anonymous voice profile identifiers, and/or explicit voice profile identifiers. The scoring component 622 may also use other techniques, such as GMMs, generative Bayesian models, or the like, to determine confidence values.

The confidence component 318 may input various data including information about the ASR confidence 607, speech length (e.g., number of frames or time of the user input), audio condition/quality data (such as signal-to-interference data or other metric data), fingerprint data, image data, or other factors to consider how confident the user authentication skill system(s) 125b is with regard to the confidence values linking users to the user input. The confidence component 318 may also consider the confidence values and associated identifiers output by the scoring component 622. Thus, the confidence component 318 may determine that a lower ASR confidence 607, or poor audio quality, or other factors, may result in a lower confidence of the user authentication skill system(s) 125b. Whereas a higher ASR confidence 607, or better audio quality, or other factors, may result in a higher confidence of the user authentication skill system(s) 125b. Precise determination of the confidence may depend on configuration and training of the confidence component 318 and the models implemented thereby. The confidence component 318 may operate using a number of different machine learning models/techniques such as GMM, neural networks, etc. For example, the confidence component 318 may be a classifier configured to map a score output by the scoring component 622 to a confidence value.

The user authentication skill system(s) 125b may output user authentication confidence data 395 specific to a single user profile identifier, anonymous voice profile identifier, or explicit voice profile identifier (or one or more user profile identifiers, one or more anonymous voice profile identifiers, and/or one or more explicit voice profile identifiers in the form of an N-best list). For example, the user authentication skill system(s) 125b may output user authentication confidence data 395 with respect to received feature vector 605. The user authentication confidence data 395 may include numeric confidence values (e.g., 0.0-1.0, 0-1000, or whatever scale the system is configured to operate). Thus, the user authentication confidence data 395 may output an N-best list of potential users with numeric confidence values (e.g., user profile identifier 123—0.2, anonymous voice profile identifier 234—0.8). Alternatively or additionally, the user authentication confidence data 395 may include binned confidence values. For example, a computed authentication score of a first range (e.g., 0.0-0.33) may be output as "low," a computed authentication score of a second range (e.g., 0.34-0.66) may be output as "medium," and a computed authentication score of a third range (e.g., 0.67-1.0) may be output as "high." Thus, the user authentication skill system(s) 125b may output an N-best list of potential users with binned confidence value (e.g., user profile identifier 123—low, anonymous voice profile identifier 234 —high). Combined binned and numeric confidence value outputs are also possible. Rather than a list of identifiers and their respective confidence values, the user authentication confidence data 395 may only include information related to the top scoring identifier as determined by the user authentication skill system(s) 125b. The user authentication skill system(s) 125b may also output an overall confidence value that the individual confidence values are correct, where the overall confidence value indicates how confident the user authentication skill system(s) 125b is in the output results. The overall confidence value may be determined by the confidence component 318.

The confidence component 318 may determine differences between individual confidence values when determining the user authentication confidence data 395. For example, if a difference between a first confidence value and a second confidence value is large, and the first confidence value is above a threshold confidence value, then the user authentication skill system(s) 125b is able to authenticate a first user (associated with the feature vector 605 associated with the first confidence value) as the user that spoke the user input with a much higher confidence than if the difference between the confidence values were smaller.

The user authentication skill system(s) 125b may perform thresholding to avoid incorrect user authentication results being output. For example, the user authentication skill system(s) 125b may compare a confidence value output by the confidence component 318 to a threshold confidence value. If the confidence value does not satisfy (e.g., does not meet or exceed) the threshold confidence, the user authentication skill system(s) 125b may not output user authentication confidence data 395, or may only include in that data 395 an indication that a user speaking the user input could not be authenticated. Further, the user authentication skill system(s) 125b may not output user authentication confidence data 395 until enough user authentication feature vector data 409 is accumulated and processed to verify a user above a threshold confidence. Thus, the user authentication skill system(s) 125b may wait until a sufficient threshold quantity of audio data of the user input has been processed before outputting user authentication data 395. The quantity of received audio data may also be considered by the confidence component 318.

The user authentication skill system(s) 125b may be defaulted to output binned (e.g., low, medium, high) user authentication confidence values. However, such may be problematic in certain situations. For example, if the user authentication skill system(s) 125b computes a single binned confidence value for multiple feature vectors 605, the system may not be able to effectively determine which user originated the user input. In this situation, the user authentication skill system(s) 125b may be configured to override its default setting and output numeric confidence values. This enables the system to determine a user associated with the highest numeric confidence value originated the user input.

The user authentication skill system(s) 125b may use other data 609 to inform user authentication processing. Thus, a trained model or other component of the user authentication skill system(s) 125b may be trained to take other data 609 as an input feature when performing authentication. Other data 609 may include a wide variety of data types depending on system configuration and may be made available from other sensors, devices, or storage. The other data 609 may include a time of day at which the audio data 211 was generated by the device 110 or received from the device 110, a day of a week in which the audio data 211 was generated by the device 110 or received from the device 110, etc.

The other data 609 may include image data or video data. For example, facial authentication may be performed on image data or video data received from the device 110 from which the audio data 211 was received (or another device). Facial recognition may be performed by the user authentication skill system(s) 125b, or another component of the speech system(s) 120. The output of facial authentication processing may be used by the user authentication skill system(s) 125b. That is, facial authentication output data may be used in conjunction with the comparison of the user authentication feature vector 409 and one or more feature vectors 605 to perform more accurate user authentication.

The other data 609 may include location data of the device 110. The location data may be specific to a building within which the device 110 is located. For example, if the device 110 is located in user A's bedroom, such location may increase a user authentication confidence value associated with user A and/or decrease a user authentication confidence value associated with user B.

The other data 609 may include data indicating a type of the device 110. Different types of devices may include, for example, a smart watch, a smart phone, a tablet computer, and a vehicle. The type of the device 110 may be indicated in a profile associated with the device 110. For example, if the device 110 from which the audio data 211 was received is a smart watch or vehicle belonging to a user A, the fact that the device 110 belongs to user A may increase a user authentication confidence value associated with user A and/or decrease a user authentication confidence value associated with user B.

The other data 609 may include geographic coordinate data associated with the device 110. For example, a group profile associated with a vehicle may indicate multiple users (e.g., user A and user B). The vehicle may include a global positioning system (GPS) indicating latitude and longitude coordinates of the vehicle when the audio data 211 is generated by the vehicle. As such, if the vehicle is located at a coordinate corresponding to a work location/building of user A, such may increase a user authentication confidence value associated with user A and/or decrease user authentication confidence values of all other users indicated in a group profile associated with the vehicle. Global coordinates and associated locations (e.g., work, home, etc.) may be indicated in a profile associated with the device 110. The global coordinates and associated locations may be associated with one or more respective users.

The other data 609 may include addition data representing activity of a particular user that may be useful in performing user authentication. For example, if a user has recently entered a code to disable a home security alarm, and the audio data 211 was received from a device 110 represented in a group profile associated with the home, signals from the home security alarm about the disabling user, time of disabling, etc. may be reflected in the other data 609 and considered by the user authentication skill system(s) 125*b*. If a mobile device (such as a smart phone, Tile, dongle, or other device) known to be associated with a particular user is detected proximate to (for example physically close to, connected to the same WiFi network as, or otherwise nearby) the device 110, this may be reflected in the other data 609 and considered by the user authentication skill system(s) 125*b*.

Depending on system configuration, the other data 609 may be configured to be included in the user authentication feature vector data 409 (for example using the encoder 550) so that all the data relating to the user input to be processed by the scoring component 622 may be included in a single feature vector. Alternatively, the other data 609 may be reflected in one or more different data structures to be processed by the scoring component 622.

Various machine learning techniques may be used to train and operate models to perform various steps described above, such as user authentication feature extraction, encoding, user authentication scoring, user authentication confidence determination, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and authentication patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The user authentication skill system(s) 125*b* may use one or more different types of user authentication processing (e.g., as described with respect to FIG. 3) depending on the data available to the user authentication skill system(s) 125*b* and/or the authentication condition (e.g., threshold authentication confidence level) that needs to be satisfied. In some examples, simply performing one type of user authentication processing may be sufficient. In other examples, two or more different types of user authentication processing may be necessary to authenticate the user to a degree satisfying the authentication condition.

Referring back to FIG. 2, the speech system(s) 120 may include profile storage 270. The profile storage 270 may include a variety of information related to individual users, groups of users, devices, etc. that interact with the speech system(s) 120. A "profile" refers to a set of data associated with a user, group of users, device, etc. The data of a profile may include preferences specific to the user, group of users, device, etc.; input and output capabilities of one or more devices; internet connectivity information; user bibliographic information; subscription information; as well as other information.

The profile storage 270 may include one or more user profiles, with each user profile being associated with a different user identifier. Each user profile may include various user identifying information. Each user profile may also include preferences of the user and/or one or more device identifiers, representing one or more devices registered to the user. Each user profile may include identifiers of skills that the user has enabled. When a user enables a skill, the user is providing the speech system(s) 120 with permission to allow the skill to execute with respect to the user's inputs. If a user does not enable a skill, the speech system(s) 120 may not permit the skill to execute with respect to the user's inputs.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 270 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

In at least some examples, the user authentication skill system(s) 125*b* (or user authentication skill 265) may intercept NLU results data prior to the NLU results data being transmitted to a corresponding skill system(s) 125*a* (as illustrated in FIGS. 7A through 7F). As such, the user authentication skill system(s) 125*b* (or user authentication skill 265) may proactively authenticate a user to a threshold necessary for the skill system(s) 125*a* to execute. The following describes processing that may be performed by the user authentication skill system(s) 125*b*. Notwithstanding, one skilled in the art will appreciate that some or all of the user authentication skill system(s) 125*b*'s processing described below may likewise be performed by the user authentication skill 265.

Referring to FIGS. 7A through 7F, a device 110 may receive (702) a user input. The user input may be a spoken user input received as audio by a microphone(s) of the device 110. Alternatively, the user input may be a text-based user input received via a keyboard (either a physical keyboard or a virtual keyboard) of the device 110. The device 110 may generate (704) data representing the user input, and may send (706) the data to the speech system(s) 120.

The speech system(s) 120 may generate (708) NLU results data representing the user input. The speech system(s) 120 may generate the NLU results data using various processing. For example, if the received data is audio data, the speech system(s) 120 (and more particularly the ASR component 250) may generate text data representing the audio data. The speech system(s) 120 (and more particularly the NLU component 260) may process the text data to generate the NLU results data. For further example, if the received data is text data, the speech system(s) 120 (and more particularly the NLU component 260) may process the text data to generate the NLU results data. In another example, if the received data is audio data, the speech system(s) 120 (and more particularly a SLU component thereof) may process the audio data to generate the NLU results data, without intermediately generating text data representing the audio data. The speech system(s) 120 (and more particularly the orchestrator component 230) may send (710) the NLU results data to the user authentication skill system(s) 125*b*.

The speech system(s) 120 may determine (712) a skill identifier corresponding to the NLU results data. If the NLU results data includes more than on NLU hypothesis, the speech system(s) 120 may determine a skill identifier corresponding to the top-scoring NLU hypothesis. The NLU results data may include a respective skill identifier associated with each NLU hypothesis represented therein, in which case the speech system(s) 120 may simply identify the skill identifier in the NLU results data (or in the NLU results data and associated with the top-scoring NLU hypothesis). The speech system(s) 120 (and more particularly the orchestrator component 230) may send (714) the skill identifier to the user authentication skill system(s) 125*b*.

In at least some examples, the NLU results data may not include skill identifiers. When this occurs, the user authentication skill system(s) 125*b* may communicate with a skill determination component of the speech system(s) 120. The skill determination component may determine a skill identifier corresponding to a skill 290 or skill system(s) 125 best suited to process with respect to the user input. The skill determination component may consider various data, including but not limited to the NLU results data, user preferences, skill enablement information, etc. The user authentication skill system(s) 125*b* may receive the skill identifier determined by the skill determination component.

The user authentication skill system(s) 125*b* may determine (716) a user authentication condition corresponding to the skill identifier. In at least some examples, the user authentication condition may be a threshold user authentication value. The threshold user authentication value may be a numeric value (e.g., within a scale of 0-10, 0-100, 0-1000, or some other scale). Alternatively, the threshold user authentication value may be a binned value (e.g., low, medium, high, etc.). In at least some examples, the user authentication skill system(s) 125*b* may determine a user authentication condition corresponding to the skill identifier as well as an intent represented in the NLU results data as corresponding to the skill identifier.

A user input may correspond to a directive to perform more than one action. For example, a user may configure a "routine" corresponding to more than one action to be performed in response to a single user input. For example, a routine may correspond to a cascade of actions to be performed. For example, if the user input corresponds to a request for a restaurant reservation, a routine may cause, after the reservation is booked, for weather information to be output as well as for the speech system(s) 120 to ask the user wants the speech system(s) 120 to book a ride with a ride sharing service. Each action of a routine may be associated with a different user authentication condition (e.g., a different threshold user authentication value). When the present user input corresponds to a routine of actions, the user authentication skill system(s) 125*b* may determine a most-stringent user authentication condition, of the routine actions, at step 416.

The user authentication skill system(s) 125*b* may determine (718), based at least in part on the user authentication condition, one or more user authentication techniques that should be used to authenticate the user to a degree that satisfies the user authentication condition. In at least some examples, the user authentication skill system(s) 125*b* may access a profile (e.g., a device profile, user profile, group profile, etc.) associated with the device 110 from which the user input was received. The user authentication skill system(s) 125*b* may determine one or more user devices indicated in the profile. Each user device, of the one or more user devices, may correspond to one or more user authentication techniques that the user device may be used to perform. Each user device and/or user authentication technique may be associated with a maximum possible weighted user authentication value that the user device, the user authentication technique, or a combination thereof, may generate. The user authentication skill system(s) 125*b* may determine to use one or more user authentication techniques that correspond to maximum possible user authentication values that, alone or in combination, may satisfy the user authentication condition.

In at least some examples, the user authentication skill system(s) 125b may determine the user authentication technique based on data provided by one or more devices 110. For example, the user authentication skill system(s) 125b may access a profile associated with the device 110 from which the user input was received. The user authentication skill system(s) 125b may determine one or more devices 110 indicated in the profile. The user authentication skill system(s) 125b may then cause the determined device(s) 110 to provide the user authentication skill system(s) 125b with various types of data (e.g., audio data, image data, etc.). Using the received data, the user authentication skill system(s) 125b may determine which authentication technique(s) to use. For example, the user authentication skill system(s) 125b may use data indicating a proximity of an individual to the device(s), data indicating whether multiple individuals are located proximate to the device(s), data indicating a noise level of captured audio, or the like, to determine one or more user authentication techniques to use.

The user authentication skill system(s) 125b may determine (720) one or more user devices configured to gather data usable in performing the determined user authentication technique(s). In the example where the profile includes one or more user devices corresponding to one or more user authentication techniques, and where the user authentication skill system(s) 125b determines the user authentication technique(s) to use from those user authentication techniques, the user authentication skill system(s) 125b may identify the one or more user devices associated with the one or more user authentication techniques in the profile.

In at least some examples, more than one user device may be associated with a particular user authentication technique. A first of the user devices may be associated with a first maximum possible user authentication value while a second of the user devices may be associated with a second, different maximum possible user authentication value. In such a situation, the user authentication skill system(s) 125b may select the user device associated with the greatest maximum possible user authentication value.

The user authentication skill system(s) 125b may send (722), to the speech system(s) 120, data requesting user authentication data. The speech system(s) 120 may thereafter send (724) the data requesting user authentication data (or data generated from and representing the data) to a device. While FIGS. 7A through 7F illustrate the device 110 that capture the user input being the device that receives the data requesting user authentication data (or data generated from and representing the data), the present disclosure is not so limited.

In at least some examples, the user authentication skill system(s) 125b may send, to the speech system(s) 120, one or more discrete packets of data requesting user authentication data, with each data packet being associated with a different device identifier. Moreover, each of the one or more data packets may, in at least some examples, represent a type of information the device, corresponding to the device identifier, is to gather. Example information types include, but are not limited to, audio including user speech, one or more images including a representation of a user, fingerprint information, iris information, a passcode, a voice passcode (whereby the passcode is verified by confirming the substantive passcode as well as confirming the speech, corresponding to the passcode, corresponds to a particular user's voice), etc. One skilled in the art will appreciate that the user authentication skill system(s) 125b may generate and send a different data packet for each user device determined at step 720. Alternatively, the user authentication skill system(s) 125b may generate and send a single data packet at step 722, with the single data packet including one or more device identifiers, with each device identifier being associated with a respective type of information to be gathered. The speech system(s) 120 may parse the received data packet to identify a device identifier and corresponding type of information, and may send (724) data to the device corresponding to the device identifier, with the data representing the type of information to be gathered. The speech system(s) 120 may perform such parsing and data transmission with respect to each device identifier, and corresponding information type, represented in the single data packet received at step 722.

In at least some examples, the user authentication skill system(s) 125b may send data, requesting a type of information, to a device 110 without using the speech system(s) 120 as an intermediary. In such examples, the user authentication skill system(s) 125b may generate and send the aforementioned described data sent at step 724.

A device 110 may receive (726) a user authentication input. The user authentication input may include information corresponding to a type of information represented in data the device 110 received at step 724. The device 110 may generate (728) user authentication data representing the user authentication input. The device 110 may send (730) the user authentication data to the speech system(s) 120, which may send (732) the user authentication data to the user authentication skill system(s) 125b. In at least some examples, the device 110 may send the user authentication data to the user authentication skill system(s) 125b without using the speech system(s) 120 as an intermediary. One skilled in the art will appreciate that steps 726 through 732 may be performed with respect to each device 110 that receives data at step 724.

The user authentication skill system(s) 125b may determine (158) a user authentication value based at least in part on the user authentication data the user authentication skill system(s) 125b receives. Each device 110 (or a component thereof used to capture user authentication input) may be associated with a respective user authentication reliability weight. As such, the user authentication skill system(s) 125b may determine (734) a weighted user authentication value based on the determined user authentication value and the device(s) (and/or device component(s)) used to capture user authentication information upon which the user authentication value was determined.

In at least some examples, the user authentication skill system(s) 125b may determine more than one weighted user authentication value. Each weighted user authentication value may be generated using a weight, associated with a particular device 110 (or component thereof), and a user authentication value generated using user authentication data received from the device 110 (or component thereof). The user authentication skill system(s) 125b may determine (736) a normalized user authentication value based at least in part on the more than one weighted user authentication value.

Various techniques may be used to determine weighted user authentication values and normalized user authentication values. In at least some examples, various rules and/or trained models may be configured to process user authentication data to determine a weighted value(s) and/or normalized value. Such rule(s)/model(s) may be based on training data indicating how various user authentication data may be received from various device (or device components) and how authentication values, corresponding to that authentication data, may be determined and weighted.

Various machine learning techniques may be used to train components of the overall system of the present disclosure (including the user authentication skill system(s) 125b). Models may be trained and operated according to various machine learning techniques. Such techniques may include, for example, inference engines, trained classifiers, etc. Examples of trained classifiers include conditional random fields (CRF) classifiers, Support Vector Machines (SVMs), neural networks (such as deep neural networks and/or recurrent neural networks), decision trees, AdaBoost (short for "Adaptive Boosting") combined with decision trees, and random forests. Focusing on CRF as an example, CRF is a class of statistical models used for structured predictions. In particular, CRFs are a type of discriminative undirected probabilistic graphical models. A CRF can predict a class label for a sample while taking into account contextual information for the sample. CRFs may be used to encode known relationships between observations and construct consistent interpretations. A CRF model may thus be used to label or parse certain sequential data, like query text as described above. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. For example, known types for previous queries may be used as ground truth data for the training set used to train the various components/models. Various techniques may be used to train the models including backpropagation, statistical learning, supervised learning, semi-supervised learning, stochastic learning, stochastic gradient descent, or other known techniques. Thus, many different training examples may be used to train the classifier(s)/model(s) discussed herein. Further, as training data is added to, or otherwise changed, new classifiers/models may be trained to update the classifiers/models as desired.

The user authentication skill system(s) 125b may be configured with a feedback loop that enables the user authentication skill system(s) 125b to gather additional user authentication data if needed. For example, the user authentication skill system(s) 125b may determine (738) whether the user authentication value (e.g., the user authentication value determined at step 158, a weighted user authentication value determined at step 732, or the normalized user authentication value determined at step 734, depending on the situation) satisfies the user authentication condition determined at step 716. In at least some examples, the user authentication skill system(s) 125b may determine whether the user authentication value (e.g., the user authentication value determined at step 158, a weighted user authentication value determined at step 734, or the normalized user authentication value determined at step 736, depending on the situation) satisfies (e.g., exceeds, or meets or exceeds) a threshold user authentication value. If the user authentication skill system(s) 125b determines the user authentication value (e.g., the user authentication value determined at step 158, a weighted user authentication value determined at step 734, or the normalized user authentication value determined at step 736, depending on the situation) fails to satisfy the user authentication condition, the overall system may re-perform some or all of steps 718 through 738. If the overall system re-performs steps 718 through 738 N amount of times and each time the user authentication skill system(s) 125b is unable to determine the user authentication condition is satisfied, the user authentication skill system(s) 125b may cease user authentication processing. The skill system(s) 125a may or may not be notified that the user could not be authenticated. For example, if the user cannot be sufficiently authenticated, the speech system(s) 120 may output an indicator of same to the user without ever invoking the skill system(s) 125a to execute.

If, instead, the user authentication skill system(s) 125b determines the user authentication condition is satisfied (whether after a first try or after re-performing user authentication processing, the user authentication skill system(s) 125b may send (162), to the skill system(s) 125a corresponding to the skill identifier determined at step 412, an indicator representing the user authentication condition has been satisfied. Such sending of the indicator may or may not involve using the speech system(s) 120 as an intermediary. The indicator may or may not include the user authentication value(s) (e.g., the user authentication value determined at step 158, a weighted user authentication value determined at step 734, or the normalized user authentication value determined at step 736, depending on the situation) determined by the user authentication skill system(s) 125b. The user authentication skill system(s) 125b (or the speech system(s) 120) may send (740), to the skill system(s) 125a, the NLU results data (or an NLU hypothesis, of the NLU results data, corresponding to the skill system(s) 125a). The skill system(s) 125a may thereafter perform processing (742), based at least in part on the indicator and the NLU results data, in the skill system(s) 125a's discretion.

As described, the user authentication skill system(s) 125b may send the indicator and the NLU results data to the skill system(s) 125a at steps 162 and 740, respectively. In at least some examples, the user authentication skill system(s) 125b may send the indicator to the speech system(s) 120 (and more particularly the orchestrator component 230 of the speech system(s) 120). The speech system(s) 120 (and more particularly the orchestrator component 230) may thereafter send the indicator and the NLU results data to the skill system 125a. In such examples, the user authentication skill system(s) 125b may not communicate directly with the skill system(s) 125a.

The speech system(s) 120 may include a dedicated voice recognition component configured to recognize one or more users' speech represented in audio data corresponding to a user input. In at least some examples, the voice recognition component may operate at least partially in parallel with the ASR component 250 (or an SLU component if the speech system(s) 120 is so configured). The voice recognition component may determine a device identifier of the device, determine user identifiers associated with the device identifier, determine a respective voice profile for one or more of the user identifiers, and determine, for each user identifier, a likelihood that a corresponding voice profile corresponds to speech represented in the user input. The user authentication skill system(s) 125b may receive, from the voice recognition component, a top scoring user identifier and associated confidence value, or an n-best list of user identifiers associated with respective confidence values. The user authentication skill system(s) 126b may use the received confidence value(s) in determining whether, at step 738, the user authentication condition is satisfied.

In at least some examples, the user authentication skill system(s) 125b may cause a device 110, while requesting and receiving user authentication input, to output an indicator representing the user authentication skill system(s) 125b, and not the skill system(s) 125a to be invoked to respond to the user input, is requesting the user authentication input. Such indicator may be an audible indicator, a visual indicator, a tactile indicator, etc. Such indicator may be interpreted by the user to represent the user authentication information request is to be trusted, and that is it not a phishing attack by an unauthorized entity.

A user may engage in a dialog with the speech system(s) 120. As used herein, "dialog," "dialog session," or the like may refer to data transmissions (such as relating to multiple user inputs and speech system(s) 120 outputs) between the speech system(s) 120 and a local device(s) 110 that all relate to a single originating user input. Thus, the data transmissions of a dialog may share a dialog identifier or other unique identifier that may be used by the components of the overall system described herein to track information across the dialog. For example, a device 110 may send the speech system(s) 120 data corresponding to "Alexa, play jeopardy." The speech system(s) 120 may output data corresponding to a jeopardy statement to the device 110 for output to a user(s). A user may then respond to the statement, which the device 110 sends as data to the speech system(s) 120. The sending of data from the device 110 to the speech system(s) 120 and the sending of data from the speech system(s) 120 to the device 110 may all correspond to a single dialog identifier. In some examples, a dialog-initiating user input may start with a wakeword and end with a command, such as "Alexa, play jeopardy," where "Alexa" is the wakeword and "play jeopardy" is the command. Subsequent user inputs of the same dialog may or may not start with speaking of a wakeword. Each user input of a dialog may be associated with a unique user input identifier such that multiple user input identifiers may be associated with a single dialog identifier.

A single instance of a user input and a corresponding system output of a dialog may be referred to as a "turn." The user authentication skill system(s) 125b may perform user authentication processing with respect to more than one turn of a dialog. In such situations, rather than starting user authentication processing anew with respect to a subsequent turn, the user authentication skill system(s) 125b may use a user authentication value (e.g., a user authentication value determined at step 158, a weighted user authentication value determined at step 734, or a normalized user authentication value determined at step 736) of a previous turn of the dialog as a starting point for user authentication processing performed with respect to a subject turn of the same dialog (e.g., associated with the same dialog identifier).

In some dialogs, a user input of a most recent turn may have been too terse to accurately perform voice-based user authentication, but voice-based user authentication may have been accurately performed in at least one other previous turn of the same dialog. Accordingly, the user authentication skill system(s) 125b may look to various previous turns of the same dialog, and not just the most recent previous turn, to obtain previous user authentication values.

Figure 8:
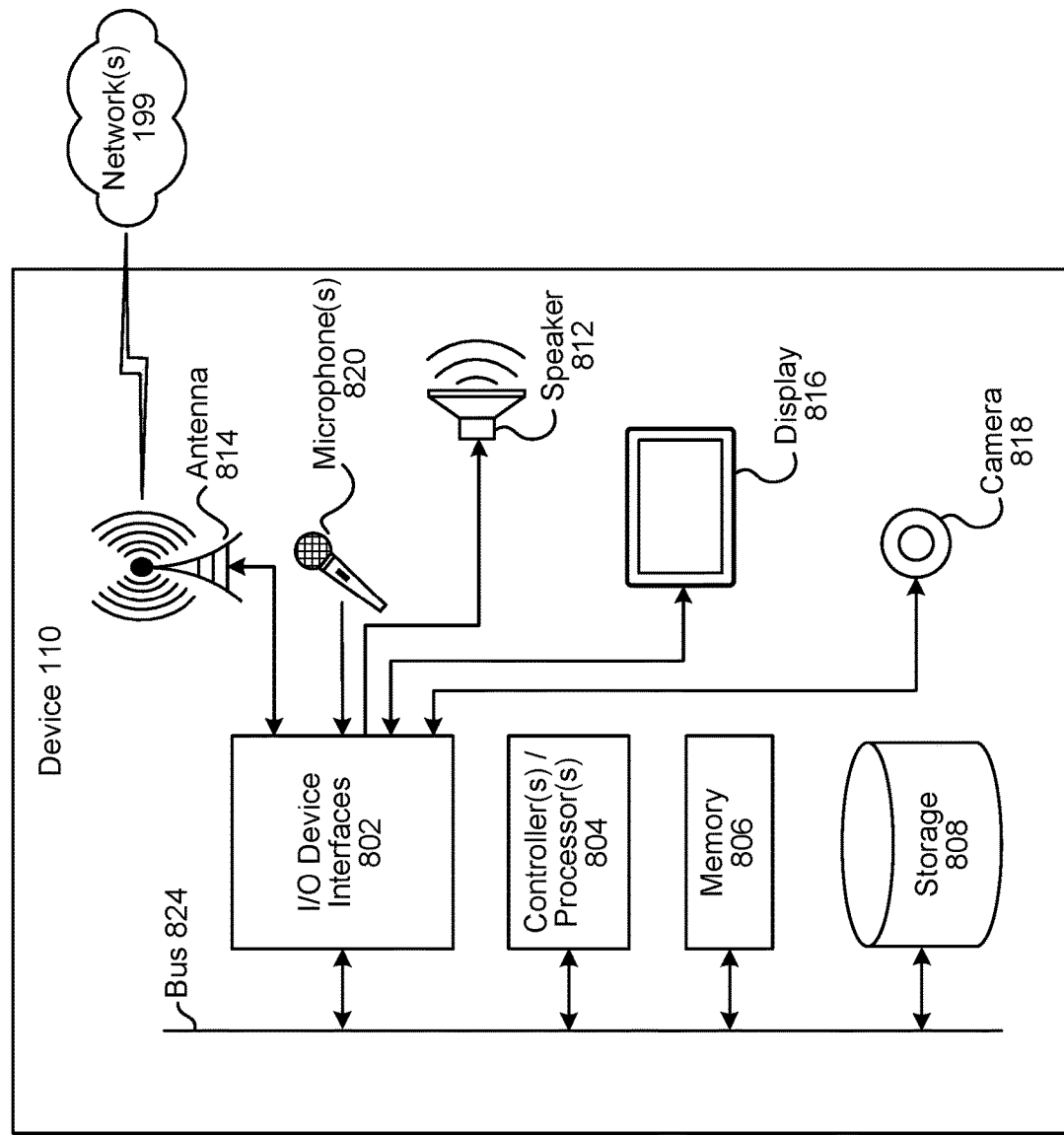
FIG. 8 is a block diagram conceptually illustrating example components of a device, in accordance with embodiments of the present disclosure.

FIG. 8 is a block diagram conceptually illustrating a device 110 that may be used with the system. FIG. 9 is a block diagram conceptually illustrating example components of a remote device, such as the speech system(s) 120, which may assist with ASR processing, NLU processing, etc., and the skill system(s) 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the overall system of the present disclosure, such as one or more speech systems 120 for performing ASR processing, one or more speech systems 120 for performing NLU processing, one or more skill system(s) 125, etc. In operation, each of these systems may include computer-readable and computer-executable instructions that reside on the respective device (120/125), as will be discussed further below.

Each of these devices (110/120/125) may include one or more controllers/processors (804/904), which may each include a central processing unit (CPU) for processing data and computer-readable instructions, and a memory (806/906) for storing data and instructions of the respective device. The memories (806/906) may individually include volatile random access memory (RAM), non-volatile read only memory (ROM), non-volatile magnetoresistive memory (MRAM), and/or other types of memory. Each device (110/120/125) may also include a data storage component (808/908) for storing data and controller/processor-executable instructions. Each data storage component (808/908) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (802/902).

Computer instructions for operating each device (110/120/125) and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software.

Each device (110/120/125) includes input/output device interfaces (802/902). A variety of components may be connected through the input/output device interfaces (802/902), as will be discussed further below. Additionally, each device (110/120/125) may include an address/data bus (824/924) for conveying data among components of the respective device.

Each component within a device (110/120/125) may also be directly connected to other components in addition to (or instead of) being connected to other components across the bus (824/924).

Referring to FIG. 8, the device 110 may include input/output device interfaces 802 that connect to a variety of components such as an audio output component such as a speaker 812, a wired headset or a wireless headset (not illustrated), or other component capable of outputting audio. The device 110 may also include an audio capture component. The audio capture component may be, for example, a microphone 820 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 816 for displaying content. The device 110 may further include a camera 818.

Via antenna(s) 814, the input/output device interfaces 802 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (802/902) may also include communication components that allow data to be exchanged between devices such as different physical servers in a collection of servers or other components.

The components of the device(s) 110, the speech system(s) 120, or the skill system(s) 125 may include their own dedicated processors, memory, and/or storage.

Alternatively, one or more of the components of the device(s) 110, the speech system(s) 120, or the skill system(s) 125 may utilize the I/O interfaces (802/902), processor(s) (804/904), memory (806/906), and/or storage (808/908) of the device(s) 110, speech system(s) 120, or the skill system(s) 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the speech system(s) 120, and the skill system(s) 125, as described herein, are illustrative, and may be located as a stand-alone device or may be included, in whole or in part, as a component of a larger device or system.

As illustrated in FIG. 10, multiple devices (110a-110j, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a microwave 110j may be connected to the network(s) 199 through a wireless service provider, over a WiFi or cellular network connection, or the like. Other devices are included as network-connected support devices, such as the speech system(s) 120, the skill system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more speech systems 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A method, comprising:
receiving, from a first device, audio data corresponding to a spoken user input;
performing speech processing with respect to the audio data to generate natural language understanding (NLU) results data corresponding to a first NLU hypothesis of the spoken user input, wherein the NLU results data represent a request for content from a speech processing system;
processing the NLU results data to determine a first skill identifier corresponding to the NLU results data, the first skill identifier corresponding to a first skill different from a user authentication skill and the first skill configured to receive the NLU results data and process the request for content;
prior to invoking the first skill by sending the request for content to the first skill, determining, by the user authentication skill, a threshold user authentication value associated with the first skill identifier and sufficient for the first skill to perform the request for content, wherein the user authentication skill is configured to process the NLU results data and to perform user authentication processing;
determining, by the user authentication skill, a type of user authentication processing to be used to authenticate a user to satisfy the threshold user authentication value;
determining, by the user authentication skill, a first user authentication technique corresponding to the first skill identifier;
in response to the user authentication skill determining a first user authentication technique, sending, to the first device, a request for first data usable to perform the type of user authentication processing;
receiving, from the first device, the first data;
performing, by the user authentication skill, the type of user authentication processing on the first data using the first user authentication technique to determine a user authentication value;
determining, by the user authentication skill, that the user authentication value satisfies the threshold user authentication value;
after determining the user authentication value satisfies the threshold user authentication value, sending, to the first skill, an indicator representing the threshold user authentication value has been satisfied; and
after determining the user authentication value satisfies the threshold user authentication value, sending, to the first skill, the NLU results data, the first skill configured to process the NLU results data to perform an action responsive to the spoken user input.

2. The method of claim 1, further comprising:
determining, by the user authentication skill, that the user authentication value fails to satisfy the threshold user authentication value;
after determining the user authentication value fails to satisfy the threshold user authentication value, determining, by the user authentication skill, a second type of user authentication processing to be used to authenticate the user to satisfy the threshold user authentication value;
sending, to the first device, a second request for second data usable to perform the second type of user authentication processing;
receiving, from the first device, the second data;
performing, by the user authentication skill, the second type of user authentication processing on the second data to determine a second user authentication value;
using the user authentication value and the second user authentication value, determining, by the user authentication skill, a third user authentication value corresponding to a normalized user authentication value;
determining, by the user authentication skill, that the third user authentication value satisfies the threshold user authentication value;
after determining the third user authentication value satisfies the threshold user authentication value, sending, to the first skill, the indicator; and
after determining the third user authentication value satisfies the threshold user authentication value, sending, to the first skill, the NLU results data.

3. The method of claim 2, further comprising:
determining, by the user authentication skill, a first reliability weight corresponding to the type of user authentication processing;
using the user authentication value and the first reliability weight, determining, by the user authentication skill, a fourth user authentication value corresponding to the type of user authentication processing;
determining, by the user authentication skill, a second reliability weight corresponding to the second type of user authentication processing;
using the second user authentication value and the second reliability weight, determining, by the user authentication skill, a fifth user authentication value corresponding to the second type of user authentication processing; and
determining the third user authentication value using the fourth user authentication value and the fifth user authentication value.

4. The method of claim 1, further comprising:
determining the spoken user input corresponds to a group of actions to be performed, the group of actions comprising a first action and a second action;
determining, by the user authentication skill, that the first action is associated with a first threshold user authentication value;
determining, by the user authentication skill, that the second action is associated with a second threshold user authentication value; and
determining the first threshold user authentication value is more stringent than the second threshold user authentication value,
wherein the first threshold user authentication value corresponds to the threshold user authentication value.

5. A system comprising:
at least one processor; and
at least one memory including instructions that, when executed by the at least one processor, cause the system to:
receive first data corresponding to a user input;
generate, using natural language understanding (NLU) processing, NLU results data corresponding to a first NLU hypothesis of the user input, wherein the NLU results data represents a request for content from a speech processing system;

process the NLU results data to determine a first skill component configured to receive the NLU results data, process the request for content;

prior to invoking the first skill component by sending the request for content to the first skill component, determine, by a user authentication component, a user authentication condition sufficient for the first skill component to perform the request for content, wherein the user authentication component is configured to process the NLU results data and to perform user authentication processing;

determine, by the user authentication component, a first user authentication technique to perform to satisfy the user authentication condition sufficient for the first skill component to perform the request for content;

in response to determining the first user authentication technique by the user authentication component, perform, by the user authentication component, user authentication processing using the first user authentication technique to determine user authentication data;

determine, by the user authentication component, the user authentication data satisfies the user authentication condition; and after performing the user authentication processing by the user authentication component, send, to the first skill component, the NLU results data and first data indicating satisfaction of the user authentication condition.

6. The system of claim 5, wherein the at least one memory further includes instructions that, when executed by the at least one processor, further cause the system to:

perform, by the user authentication component, a first type of user authentication processing to generate a first user authentication value;

perform, by the user authentication component, a second type of user authentication processing to generate a second user authentication value;

based at least in part on the first user authentication value and the second user authentication value, determine, by the user authentication component, a third user authentication value;

determine, by the user authentication component, that the third user authentication value satisfies the user authentication condition; and after determining the third user authentication value satisfies the user authentication condition, send, to the first skill component, the NLU results data.

7. The system of claim 6, wherein the at least one memory further includes instructions that, when executed by the at least one processor, further cause the system to:

determine the first user authentication value fails to satisfy the user authentication condition;

wherein the user authentication component performs the second type of user authentication processing after determining the first user authentication value fails to satisfy the user authentication condition.

8. The system of claim 6, wherein the at least one memory further includes instructions that, when executed by the at least one processor, further cause the system to:

determine, by the user authentication component, a first reliability weight corresponding to the first type of user authentication processing;

based at least in part on the first user authentication value and the first reliability weight, determine, by the user authentication component, a fourth user authentication value;

determine, by the user authentication component, a second reliability weight corresponding to the second type of user authentication processing;

based at least in part on the second user authentication value and the second reliability weight, determine, by the user authentication component, a fifth user authentication value; and determine the third user authentication value based at least in part on the fourth user authentication value and the fifth user authentication value.

9. The system of claim 6, wherein the at least one memory further includes instructions that, when executed by the at least one processor, further cause the system to:

determine a dialog identifier associated with the first data, the dialog identifier representing a plurality of data corresponding to various related user inputs and corresponding system outputs;

determine, by the user authentication component, second data associated with the dialog identifier, the second data corresponding to a second user input;

determine, by the user authentication component, a fourth user authentication value associated with the second data; and based at least in part on the first user authentication value, the second user authentication value, and the fourth user authentication value, determine, by the user authentication component, the third user authentication value.

10. The system of claim 6, wherein the at least one memory further includes instructions that, when executed by the at least one processor, further cause the system to:

after determining the third user authentication value satisfies the user authentication condition, send, to the first skill component, an indicator representing the user authentication condition has been satisfied.

11. The system of claim 6, wherein the at least one memory further includes instructions that, when executed by the at least one processor, further cause the system to:

determine the user input corresponds to a group of actions to be performed, the group of actions comprising a first action and a second action;

determine, by the user authentication component, that the first action is associated with a first user authentication condition;

determine, by the user authentication component, that the second action is associated with a second user authentication condition; and determine the first user authentication condition is more stringent than the second user authentication condition, wherein the first user authentication condition corresponds to the user authentication condition.

12. A computer-implemented method comprising:

receiving first data corresponding to a user input;

generating, using natural language understanding (NLU) processing, NLU results data corresponding to a first NLU hypothesis of the user input, wherein the NLU results data represents a request for content from a speech processing system;

processing the NLU results data to determine a first skill component configured to receive the NLU results data, process the request for content;

prior to invoking the first skill component by sending the request for content to the first skill component, determining, by a user authentication component, a user authentication condition sufficient for the first skill component to perform the request for content, wherein the user authentication component is configured to process the NLU results data and to perform user authentication processing;

determining, by the user authentication component, a first user authentication technique to perform to satisfy the user authentication condition sufficient for the first skill component to perform the request for content;

in response to determining the first user authentication technique by the user authentication component, performing, by the user authentication component, user authentication processing using the first user authentication technique to determine user authentication data;

determining, by the user authentication component, the user authentication data satisfies the user authentication condition; and after performing the user authentication processing by the user authentication component, sending, to the first skill component, the NLU results data and first data indicating satisfaction of the user authentication condition.

13. The computer-implemented method of claim 12, further comprising:

performing, by the user authentication component, a first type of user authentication processing to generate a first user authentication value;

performing, by the user authentication component, a second type of user authentication processing to generate a second user authentication value;

based at least in part on the first user authentication value and the second user authentication value, determining, by the user authentication component, a third user authentication value;

determining, by the user authentication component, that the third user authentication value satisfies the user authentication condition; and after determining the third user authentication value satisfies the user authentication condition, sending, to the first skill component, the NLU results data.

14. The computer-implemented method of claim 13, further comprising:

determining the first user authentication value fails to satisfy the user authentication condition;

wherein the user authentication component performs the second type of user authentication processing after determining the first user authentication value fails to satisfy the user authentication condition.

15. The computer-implemented method of claim 13, further comprising:

determining, by the user authentication component, a first reliability weight corresponding to the first type of user authentication processing;

based at least in part on the first user authentication value and the first reliability weight, determining, by the user authentication component, a fourth user authentication value;

determining, by the user authentication component, a second reliability weight corresponding to the second type of user authentication processing;

based at least in part on the second user authentication value and the second reliability weight, determining, by the user authentication component, a fifth user authentication value; and determining the third user authentication value based at least in part on the fourth user authentication value and the fifth user authentication value.

16. The computer-implemented method of claim 13, further comprising:

determining a dialog identifier associated with the first data, the dialog identifier representing a plurality of data corresponding to various related user inputs and corresponding system outputs;

determining, by the user authentication component, second data associated with the dialog identifier, the second data corresponding to a second user input;

determining, by the user authentication component, a fourth user authentication value associated with the second data; and based at least in part on the first user authentication value, the second user authentication value, and the fourth user authentication value, determining, by the user authentication component, the third user authentication value.

17. The computer-implemented method of claim 13, further comprising:

after determining the third user authentication value satisfies the user authentication condition, sending, to the first skill component, an indicator representing the user authentication condition has been satisfied.

18. The computer-implemented method of claim 13, further comprising:

determining the user input corresponds to a group of actions to be performed, the group of actions comprising a first action and a second action;

determining, by the user authentication component, that the first action is associated with a first user authentication condition;

determining, by the user authentication component, that the second action is associated with a second user authentication condition; and determining the first user authentication condition is more stringent than the second user authentication condition, wherein the first user authentication condition corresponds to the user authentication condition.

* * * * *